(12) United States Patent
Rhyne et al.

(10) Patent No.: US 10,784,006 B2
(45) Date of Patent: *Sep. 22, 2020

(54) INTEGRATED SYSTEM FOR CONVERTING NUCLEAR ENERGY INTO ROTATIONAL AND THERMAL ENERGY

(71) Applicant: NuGen, LLC, Charlotte, NC (US)

(72) Inventors: Stephen K. Rhyne, Charlotte, NC (US); Pavel V. Tsvetkov, College Station, TX (US)

(73) Assignee: NuGen, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,977

(22) Filed: Sep. 11, 2019

(65) Prior Publication Data

US 2020/0005955 A1      Jan. 2, 2020

Related U.S. Application Data

(63) Continuation of application No. 15/809,652, filed on Nov. 10, 2017.

(51) Int. Cl.
  *G21D 5/02* (2006.01)
  *G21C 13/02* (2006.01)
  (Continued)

(52) U.S. Cl.
  CPC .......... *G21D 5/02* (2013.01); *F02C 1/05* (2013.01); *G21C 13/02* (2013.01); *G21C 13/024* (2013.01);
  (Continued)

(58) Field of Classification Search
  CPC ... G21D 5/02; G21D 5/06; G21D 1/02; F02C 1/05; G21C 13/024; G21C 15/12; G21C 15/253
  (Continued)

(56) References Cited

U.S. PATENT DOCUMENTS

| 3,038,308 | A |   | 6/1962 | Fuller |
| 3,336,207 | A | * | 8/1967 | Peterson ............... C02F 1/16 376/317 |

(Continued)

FOREIGN PATENT DOCUMENTS

| MX | 197187 B | 5/2000 |
| PH | 1/2014/000128 A | 11/2015 |

OTHER PUBLICATIONS

Advertisement—The Closed-Cycle Gas-Cooled Reactor . . . A Progress Report From Ford Instrument, Scientific American, Inc. (1956) 1 page.

(Continued)

*Primary Examiner* — Jack W Keith
*Assistant Examiner* — Daniel Wasil
(74) *Attorney, Agent, or Firm* — Alston & Bird LLP

(57) ABSTRACT

Provided is an apparatus for generating electricity, mechanical energy, and/or process and district heat using a gas propellant chamber fueled with fissile material and enclosed in a sealed containment vessel which also contains an operating gas. The system allows for the operating gas to be compressed as it enters the nuclear fuel chamber where it is heated. As the operating gas exits the nuclear fuel chamber, the kinetic energy of the gas is converted to rotational energy by a variety of methods. The rotational energy is further converted to electricity, mechanical energy, and/or process and district heat. The operating gas circulates in the containment vessel and is cooled prior to re-entering the gas propellant chamber. The apparatus thereby provides a simpler and safer design that is both scalable and adaptable. The apparatus is easily and safely transportable and can be designed to be highly nuclear-proliferation-resistant.

19 Claims, 12 Drawing Sheets

(51) Int. Cl.

| | | |
|---|---|---|
| *F02C 1/05* | (2006.01) | |
| *G21C 13/024* | (2006.01) | |
| *G21C 15/12* | (2006.01) | |
| *G21C 15/253* | (2006.01) | |
| *G21D 1/02* | (2006.01) | |
| *G21D 5/06* | (2006.01) | |
| *F04D 17/10* | (2006.01) | |
| *F04D 19/00* | (2006.01) | |

(52) U.S. Cl.
CPC .......... *G21C 15/12* (2013.01); *G21C 15/253* (2013.01); *G21D 1/02* (2013.01); *F04D 17/10* (2013.01); *F04D 19/00* (2013.01); *G21D 5/06* (2013.01)

(58) Field of Classification Search
USPC .......................................................... 376/317
See application file for complete search history.

(56) References Cited

U.S. PATENT DOCUMENTS

| | | | |
|---|---|---|---|
| 3,897,838 | A | 8/1975 | Hosegood |
| 5,255,509 | A * | 10/1993 | Powell .................. G21D 5/02 376/381 |
| 5,309,492 | A | 5/1994 | Adams |
| 6,071,482 | A | 6/2000 | Brockerhoff et al. |
| 6,707,871 | B1 * | 3/2004 | Thomson ................ G21D 5/02 376/318 |
| 6,877,309 | B1 | 4/2005 | Rhyne |
| 7,073,319 | B1 | 7/2006 | Rhyne |
| 8,170,173 | B2 | 5/2012 | Reyes et al. |
| 8,437,446 | B2 | 5/2013 | Young et al. |
| 8,472,581 | B2 | 6/2013 | Young |
| 8,542,792 | B1 | 9/2013 | Young et al. |
| 8,588,360 | B2 | 11/2013 | Reyes et al. |
| 8,687,759 | B2 | 4/2014 | Reyes et al. |
| 8,731,130 | B2 | 5/2014 | Reyes et al. |
| 8,744,035 | B1 | 6/2014 | Young et al. |
| 8,752,510 | B2 | 6/2014 | Williams et al. |
| 8,824,619 | B2 | 9/2014 | Young et al. |
| 8,848,855 | B2 | 9/2014 | Nylander et al. |
| 8,867,689 | B2 | 10/2014 | Houghton et al. |
| 8,891,723 | B2 | 11/2014 | Reyes et al. |
| 9,188,328 | B2 | 11/2015 | Williams et al. |
| 9,230,697 | B2 | 1/2016 | Groome et al. |
| 9,305,671 | B2 | 4/2016 | Hough |
| 9,330,796 | B2 | 5/2016 | Reyes et al. |
| 9,403,205 | B2 | 8/2016 | Williams et al. |
| 9,406,409 | B2 | 8/2016 | Reyes et al. |
| 9,431,136 | B2 | 8/2016 | Reyes et al. |
| 9,588,082 | B2 | 3/2017 | Pollock et al. |
| 9,697,917 | B2 | 7/2017 | Snuggerud |
| 9,721,682 | B2 | 8/2017 | Young et al. |
| 9,866,063 | B2 | 1/2018 | Hough |
| 9,870,838 | B2 | 1/2018 | Reyes et al. |
| 9,881,703 | B2 | 1/2018 | Liszkai et al. |
| 9,881,704 | B2 | 1/2018 | Harris |
| 9,897,234 | B2 | 2/2018 | Koski et al. |
| 9,897,308 | B2 | 2/2018 | Lobscheid |
| 9,945,704 | B2 | 4/2018 | Galvez |
| 9,984,777 | B2 | 5/2018 | Reyes et al. |
| 9,997,262 | B2 | 6/2018 | Liszkai et al. |
| 10,147,507 | B2 | 12/2018 | Groome et al. |
| 10,186,334 | B2 | 1/2019 | Reyes et al. |
| 10,191,464 | B2 | 1/2019 | Snuggerud et al. |
| 10,269,460 | B2 | 4/2019 | Butchart |
| 10,304,570 | B2 | 5/2019 | Cadell et al. |
| 10,304,575 | B2 | 5/2019 | Hough et al. |
| 10,319,484 | B1 | 6/2019 | Reyes, Jr. |
| 10,333,342 | B2 | 6/2019 | Hough |
| 10,354,762 | B2 | 7/2019 | Keller et al. |
| 2001/0052704 | A1 | 12/2001 | Bosley et al. |
| 2011/0116591 | A1 | 5/2011 | Nishiguchi |
| 2013/0133325 | A1 | 5/2013 | McCall |
| 2015/0187447 | A1 | 7/2015 | Liszkai |
| 2015/0332794 | A1 | 11/2015 | Nguyen |
| 2016/0049210 | A1 | 2/2016 | Filippone et al. |
| 2016/0055927 | A1 | 2/2016 | Mirsky et al. |
| 2016/0180975 | A1 | 6/2016 | Morrill et al. |
| 2016/0189811 | A1 | 6/2016 | Pottorf et al. |
| 2016/0232996 | A1 | 8/2016 | Liszkai |
| 2016/0232998 | A1 | 8/2016 | Reyes et al. |
| 2016/0276046 | A1 | 9/2016 | Liszkai et al. |
| 2016/0303694 | A1 | 10/2016 | Williams et al. |
| 2017/0045869 | A1 | 2/2017 | Buenaventura et al. |
| 2017/0159867 | A1 | 6/2017 | Lynch et al. |
| 2017/0178756 | A1 | 6/2017 | Ingersoll et al. |
| 2017/0178757 | A1 | 6/2017 | Hough et al. |
| 2017/0213608 | A1 | 7/2017 | Keller et al. |
| 2017/0263344 | A1 | 9/2017 | Snuggerud |
| 2017/0301422 | A1 | 10/2017 | Kitto et al. |
| 2017/0310116 | A1 | 10/2017 | Vvike et al. |
| 2018/0090237 | A1 * | 3/2018 | Filippone ................. G21D 5/02 |
| 2018/0151262 | A1 | 5/2018 | Reyes et al. |
| 2018/0186545 | A1 | 7/2018 | Zocher |
| 2018/0190392 | A1 | 7/2018 | Lobscheid |
| 2018/0190393 | A1 | 7/2018 | Snuggerud |
| 2018/0190395 | A1 | 7/2018 | Clarkson et al. |
| 2018/0190397 | A1 | 7/2018 | Noel |
| 2018/0190402 | A1 | 7/2018 | Shaw et al. |
| 2018/0226162 | A1 | 8/2018 | Liszkai et al. |
| 2018/0252561 | A1 | 9/2018 | Galvez |
| 2018/0261343 | A1 | 9/2018 | Reyes et al. |
| 2018/0330833 | A1 | 11/2018 | Liszkai |
| 2019/0206579 | A1 | 7/2019 | Liszkai |

OTHER PUBLICATIONS

Filippone, C. et al., The Holos Reactor: A Distributable Power Generator With Transportable Subcritical Power Modules, The Holos Reactor (dated Jun. 25, 2017) 49 pages.
Innovative closed cycle gas cooled reactor—circa Apr. 1956—Atomic Insights [retrieved Jan. 26, 2018). Retrieved from the Internet: URL:https://atomicinsights.com/innovative-closed-cycle-gas-cooled-reactor-circa-april-1956/. (dated Jan. 3, 2016) 13 pages.
International Search Report and Written Opinion for Application No. PCT/IB2018/058086 dated May 30, 2019, 16 pages.
Jo, C. K. et al., Preliminary Core Analysis of a Micro Modular Reactor, Transactions on the Korean Nuclear Society Spring Meeting, May 29-30, 2014, 4 pages.
ML-1—Wikipedia [online] [retrieved Nov. 10, 2017]. Retrieved from the Internet: <URL: https://en.wikipedia.org/wiki/ML-1?domain=en.wikipedia.org>. (dated Nov. 20, 2015) 3 pages.
ML-1 Mobile Power System: Reactor in a Box—Atomic Insights, [online] [retrieved Jan. 26, 2018). Retrieved from the Internet: <URL: https://atomicinsights.com/m11-mobile-power-system-reactor-box/>. (dated Nov. 1, 1995) 4 pages.
Orbiting Combustor Nozzle Jet Engine [online] [retrieved Nov. 10, 2017]. Retrieved from the Internet: <URL: https://www.secretprojects.co.uk/forum/index.php?topic=10967.0>. (dated Sep. 4, 2010) 4 pages.
Suid, L. H., The Army's Nuclear Power Program, The Evolution of a Support Agency (1990) 89-93.
Very Small Modular Nuclear Fission Reactors for Military and Space Applications [online] [retrieved Nov. 10, 2017]. Retrieved from the Internet: <URL: https://www.nextbrigfuture.com/2017/07/very-small-modular-nuclear-fission-reactors-for- . . . >. (dated Jul. 11, 2017) 13 pages.
What Will Advanced Nuclear Power Plants Cost?, Energy Innovation Reform Project (undated) 43 pages.
Zhao, J-C., Safe and Secure Micro Modular Reactors, ARPA-E Safe and Secure Megawatt-Size Nuclear Power Workshop, Mar. 16-17, 2016, 23 pages.
Dan Yurman, "Mini Reactors Are Going Places and Pack a Lot of Power," [online] [retrieved on Aug. 16, 2019] retrieved from the Internet <https://www.energycentral.com/c/ec/mini-reactors-are-going-places-and-pack-lot-power>, dated Aug. 6, 2019, 19 pages.
https://www.behance.net/gallery/21691891/Imploturbocompressor, retrieved from internet Jun. 26, 2020.

(56) References Cited

OTHER PUBLICATIONS https://www.youtube.com/watch?v=0cPo9Lf44TE, retrieved from internet Jun. 26, 2020.
https://www.behance.net/gallery/21019191/Novel-Rotary-Turbo-InFlow-Tech-Gearturbine-Project, retrieved from internet Jun. 26, 2020.
https://padlet.com/gearturbine/un2s1bar3s94, retrieved from internet Jun. 26, 2020.
http://stateoftheartnovelinflowtech.blogspot.com, retrieved from internet Jun. 26, 2020.
English abstract only of MX Application Appln No. 99010848 filed Jul. 16, 2004.

* cited by examiner

INTEGRATED SYSTEM FOR CONVERTING NUCLEAR ENERGY INTO ROTATIONAL AND THERMAL ENERGY

CROSS-REFERENCE TO RELATED APPLICATION(S)

This application is a continuation application of U.S. patent application Ser. No. 15/809,652, filed Nov. 10, 2017 (now U.S. Publication No. 2019/0148027), which is incorporated by reference herein in its entirety.

BACKGROUND

For over fifty years, electricity from nuclear energy has been generated by large-scale power plants utilizing nuclear reactors as the energy source to heat coolant in the reactor that, directly or indirectly, drives a turbine that generates electricity. Such power generation systems typically use the conversion of nuclear energy to thermal energy to generate electricity. Fuel assemblies containing fissile material are placed within the reactor core and coolant flows through the reactor core, where the heat generated by the individual fuel assemblies is transferred to the coolant. In one common commercial power generation system—known as a pressurized water reactor system—the nuclear-heated primary coolant is directed through at least one heat transfer apparatus (e.g., a heat exchanger, steam generator and piping) in which the thermal energy of the heated coolant is transferred to a secondary coolant which is then used to drive the turbine while the reactor coolant, now cooled, is pumped back to the reactor core in a closed loop coolant system.

Applicant has identified a number of deficiencies and problems associated with conventional nuclear power generating systems. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods and systems for nuclear power generation, particularly nuclear power generation using a gas propellant for the energy conversion.

Embodiments of this invention could be deployed in various physical circumstances (on-grid; off-grid, including in remote locations; and in space). Embodiments of this invention could also be used for a variety of applications, including baseload electricity production, electricity to meet peaking power demand, off-grid electricity to secure installations, desalination; heat process production for industrial, refining and mining; and mechanical energy for various current and future devices, vehicles, and ships (including to power propellers).

Embodiments provided herein may relate to an apparatus for generating electricity comprising a gas propellant chamber comprised of an annular body defining first and second ends, the first end of the annular body defining an inlet assembly that is configured to draw operating gas into the gas propellant chamber and the second end defining an exhaust assembly that is configured to expel operating gas from the gas propellant chamber; a nuclear fuel chamber positioned within the annular body of the gas propellant chamber between the first and second ends, the nuclear fuel chamber configured to heat the operating gas; a compressor positioned proximate the first end of the gas propellant chamber, the compressor configured to compress the operating gas prior to entry into the nuclear fuel chamber; a conversion apparatus positioned proximate the second end of the gas propellant chamber, the conversion apparatus configured to convert kinetic energy of the operating gas exiting the nuclear fuel chamber into rotational energy; and a drive shaft extending axially through the gas propellant chamber between the first and second ends, the drive shaft coupling the compressor to the conversion apparatus.

In some embodiments, the compressor may be an axial compressor. In some embodiments, the compressor may be a centrifugal compressor. In some embodiments, the compressor may be a centrifugal compressor without a diffuser. In some embodiments, the gas propellant chamber may be housed in a containment vessel, the containment vessel having an inner wall and defining a region between the inner wall and the annular body of the gas propellant chamber, the region forming a bypass for operating gas to pass around the annular body. In some embodiments, the apparatus may further include a circulation fan rotationally coupled to the compressor and conversion apparatus and disposed proximate to the compressor, wherein the circulation fan is configured to draw operating gas into the compressor and the bypass around the nuclear fuel chamber.

In some embodiments, the operating gas comprises air, argon, helium, carbon dioxide, or combinations thereof. In some embodiments, the nuclear fuel chamber may house nuclear fuel elements and defines one or more interior chambers forming one or more elongate flow paths within the nuclear fuel chamber for the operating gas to pass through and be heated by the nuclear fuel elements. In some embodiments, the nuclear fuel chamber may house nuclear fuel elements and defines one or more interior chambers forming one or more elongate flow paths within the nuclear fuel chamber for the operating gas to pass through and be heated by the nuclear fuel elements, the one or more elongate flow paths disposed in a spiral configuration.

In some embodiments, the exhaust assembly may comprise a nozzle configured to propel the operating gas at the conversion assembly and the conversion apparatus comprises a turbine assembly, wherein the turbine assembly comprises turbine blades and is configured such that each of the turbine blades rotate during operation of the turbine assembly.

In some embodiments, the compressor may comprise compressor blades and is configured such that each of the compressor blades rotate during operation of the compressor.

In some embodiments, the exhaust assembly may comprise a nozzle and the conversion apparatus may comprise a turbine assembly with at least one blade assembly in line with an exit of the nozzle.

In some embodiments, the apparatus may comprise a flywheel positioned downstream of the nuclear fuel chamber and rotationally coupled to the compressor and conversion apparatus.

In some embodiments, the nuclear fuel chamber may rotate along a common axis with the compressor and conversion assembly.

In some embodiments, the gas propellant chamber may be disposed in a containment vessel, the containment vessel having an inner wall defining a circulation path for the operating gas to travel from the conversion apparatus to the inlet assembly. In some embodiments, the gas propellant chamber may be disposed in a containment vessel, the containment vessel having an inner wall defining a circulation path for the operating gas to travel from the conversion apparatus to the inlet assembly, wherein the circulation path has a first diameter and a second diameter, the second diameter being larger than the first diameter and disposed downstream of the first diameter. In some embodiments, the containment vessel may comprise a first surface and a second surface, the first surface disposed between the circulation path and the second surface, and a cooling mechanism between the first and second surface such that the operating gas flowing through the circulation path is cooled upon contact with the first surface. In some embodiments, the circulation path may comprise cooling pipes disposed along the circulation path in contact with the operating gas. In some embodiments, the conversion apparatus may comprise a nozzle connected to a rotor wherein the rotor is in communication with a stator belt and, wherein the nozzle and rotor are configured to rotate along an axis as the operating gas enters and exits the nozzle thereby generating electricity. In some embodiments, the apparatus may include a propeller rotationally coupled to the compressor and conversion apparatus.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE FIGURES

Reference will now be made to the accompanying drawings, which are not necessarily drawn to scale, and wherein.

DETAILED DESCRIPTION

Figure 1:
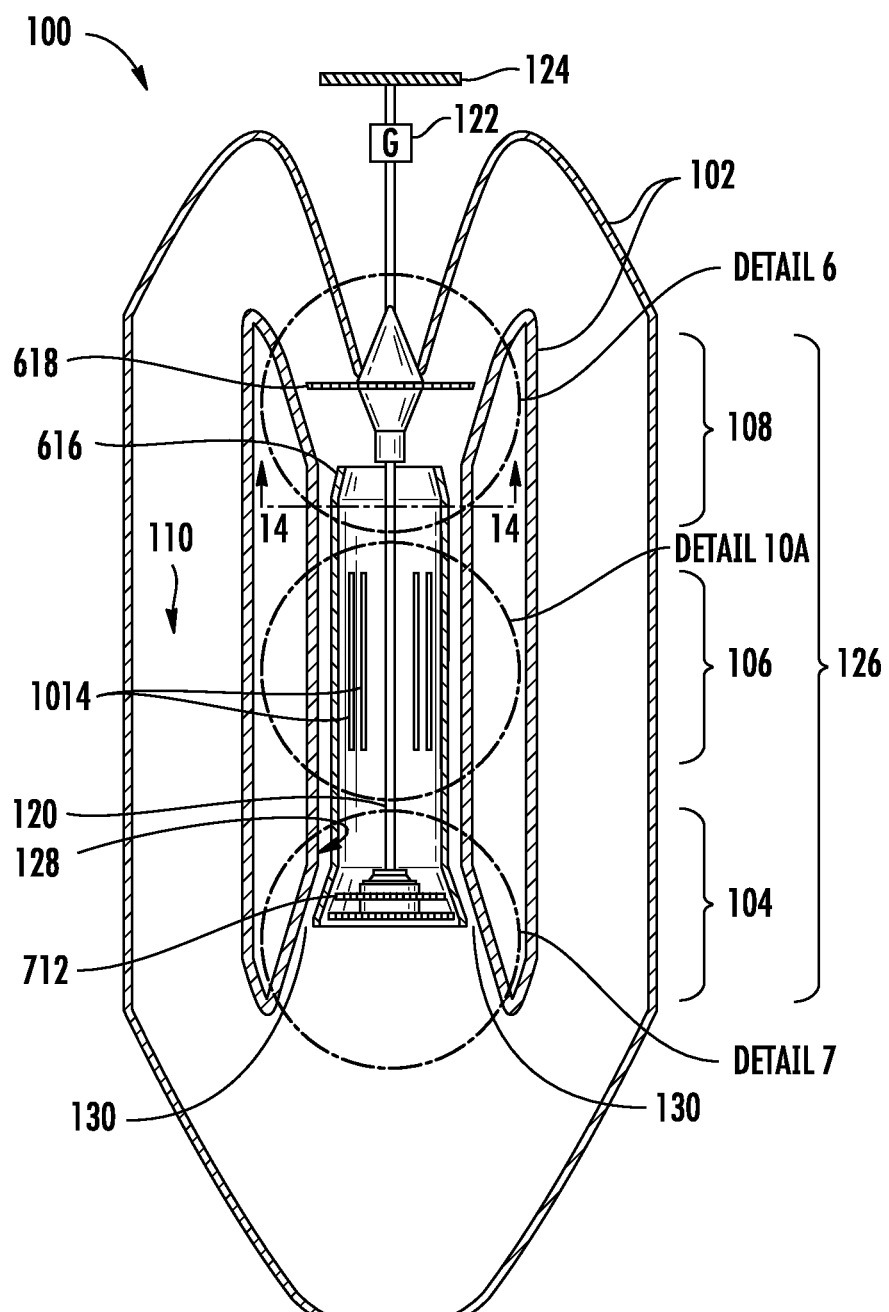
FIG. 1 illustrates a partial section view of a nuclear power generation apparatus having a rotationally coupled compressor and conversion apparatus coupled through a nuclear fuel chamber in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

While no serious threats to public health or the environment have occurred in the United States from the operation of nuclear reactors in electrical power generation systems, the public perception of nuclear reactors includes several safety concerns, although many of these concerns may be exaggerated. Due to the size of the current commercial nuclear power generation stations as well as the design and inherent operational characteristics of the nuclear reactor, nuclear power generation stations must, to the extent possible, be operated continuously. Further, locations suitable for such large power generation facilities are limited, especially considering that large electricity demands are typically found in densely populated areas while sparsely populated areas usually have small electricity demands relative to the electricity supplied by a conventional commercial nuclear power generating station. Finally, many of the existing nuclear reactors are reaching the end of their originally licensed operational periods, while other reactors are being closed or are being considered for closing for economic reasons, primarily in unregulated markets.

The potential reduction in our existing nuclear fleet is occurring at a time of growing public interest in clean energy due in part to climate change concerns. Over the past decade, increasing industry and public interest has been given to small modular reactors ("SMRs") due to this reduction in our existing nuclear fleet and the recognized advantages of SMRs over current large nuclear reactors. These advantages include enhanced safety due to passive safety; lower capital costs due to modular components and factory manufacture; siting flexibility; greater applications such as heat process;

and more proliferation resistance. The concerns about climate change have also led during the past decade to increased interest in SMRs. SMRs include both water-cooled reactors and other types of reactors, such as gas-cooled high-temperature reactors, molten-salt reactors and lead-cooled fast reactors, with some of these reactors also being classified as "advanced" SMRs.

Provided is an improved system for producing energy and generating electricity using a nuclear fueled reactor and methods of using the same. The apparatus may eliminate certain heat exchangers, piping, and other thermal conversion machinery typically utilized in other nuclear power generation apparatus. In contrast to these conventional systems, the present apparatus utilizes kinetic energy from the operating gas exiting the nuclear-fueled reactor to directly generate rotational energy which can then be converted to electricity or mechanical energy.

The present apparatus uses a single phase coolant, in particular, a gas phase coolant. In contrast to prior systems, the present apparatus uses gas (single phase fluid) as both the reactor coolant (heat removal agent and carrier) and working fluid in the energy conversion. In addition, atmospheric gasses (ambient gasses) may be used. Further, the nuclear energy source and conversion of kinetic energy to rotational energy and then to electricity can be integrated in a manner that eliminates the complex array of heat exchangers and piping often used in conventional systems. The present apparatus thereby provides an integral unit configuration that is a simpler, more reliable and safer design, one which may reduce the risks of heat exchanger breakdowns, leaks of various kinds and may reduce the risk of core damage.

The present apparatus has a scalable and adaptable design, being truly modular and capable of manufacture in a factory, where the nuclear fuel can be securely loaded within an integral unit. Factory manufacture means that the apparatus would have lower and more predictable capital costs. The apparatus is easily and safely transportable, and the apparatus can be designed to be highly nuclear-proliferation-resistant. The apparatus is capable of wide-spread deployment over various applications, such as electricity generation, process heat, desalination, and power production in space.

In the present apparatus, the kinetic energy to generate electricity is produced by heating a pressurized operating gas flowing through a nuclear fuel core in a gas propellant chamber. The gas has dual functions—it is a primary coolant for the nuclear fuel core as well as working fluid for the energy conversion. Once heated, the operating gas directly impacts a conversion assembly for converting kinetic energy to rotational energy. The conversion assembly may include a variety of components in a variety of configurations and generally includes a blade assembly where the blades are directly impacted by the operating gas.

The conversion assembly is in communication with a generator. As the operating gas impacts the conversion assembly, a significant portion of the kinetic energy of the gas is converted to rotational energy by causing the blades of the conversion assembly to rotate. The rotational energy is then converted to electricity by way of one or more generators in communication with the conversion assembly. The conversion assembly may also include a drive shaft that could convert the rotational energy to mechanical energy for other energy production (such as to power a propeller), separately or in addition to electricity generation. As the operating gas exits the conversion assembly, the operating gas is dispersed in the containment vessel, where it can travel back to the inlet assembly of the gas propellant chamber for recycle. The spinning blades of the conversion assembly may help disperse the operating gas through the containment vessel. Accordingly, the present apparatus can be designed as a closed system, where the components are enclosed in a sealed containment vessel and the operating gas is continuously recycled through the apparatus.

The apparatus is generally designed to focus on the fluid transportation through the apparatus, through each of the inlet assembly, nuclear fuel chamber, and exhaust assembly, to increase the velocity and volume of fluid impacting the conversion assembly. Various components of the apparatus and their arrangement in the apparatus allow for the high velocity and volume of fluid through the apparatus as will be discussed throughout the present disclosure. The apparatus allows for the fluid to be propelled at the conversion assembly for high efficient energy conversion. For instance, the conversion assembly may include a turbine assembly in communication with a compressor. Both the turbine assembly and compressor include blades that rotate during operation such that no stationary blades are present during operation. The removal of stationary blades may avoid any energy losses or decrease in velocity due to the operating gas coming in contact with the stationary blades. In general, neither the turbine assembly nor the compressor include a diffuser, which in conjunction with the turbine or compressor, may reduce the velocity of the fluid through the apparatus.

The turbine assembly and compressor are connected by a drive shaft through the nuclear fuel chamber such that both components rotate and continuously drive each other in the apparatus and avoid energy losses that may occur with two separately driven components (e.g., where the compressor and turbine assembly are driven separately). In addition, high performance bearings (e.g., magnetic bearings) may be used in the components (e.g., the turbine assembly) to minimize friction and thereby reduce reductions in velocity through the apparatus.

In some embodiments, the containment vessel housing each of the inlet assembly, nuclear fuel chamber, and exhaust assembly may be designed such that the operating gas is able to expand and thus cool in the containment vessel prior to re-entering the inlet assembly. The containment vessel may also include other cooling mechanisms which would be incorporated in a manner to facilitate, or at least not substantially impede, the gas transportation through the apparatus.

In some embodiments, the configuration of the nuclear fuel chamber may be such to promote the velocity of the operating gas exiting the inlet assembly (e.g., compressor) through the nuclear fuel chamber. This may occur by, for example, helical or spiral flow paths through the nuclear fuel chamber or otherwise configuring the flow paths to funnel through the nuclear fuel chamber, and various other configurations. The helical flow paths, for example, may minimize changing the operating gas's flow vector. The helical flow paths may include entrances that are beveled or otherwise aerodynamically shaped to minimize disruption or drag on the entering gas flow. The gas propellant chamber and its components and the containment vessel (including the circulation path) are generally designed to minimize air and surface friction.

The present apparatus provides an innovative carbon-free energy source for electricity, mechanical energy production, and process heat that improves safety and is highly proliferation-resistant, capable of factory manufacture, and has an adaptable design to maximize potential applications. The present apparatus may be used for general electricity production (including clustering units together) or for special purposes, such as localized use or meeting peak demands, providing energy source for remote regions or regions with limited infrastructure, or applications where localized power source is needed and no fuel source is readily available. The apparatus may also be used to provide, concurrently with or separately from the electricity, process heat and mechanical energy for various applications.

As used herein, the term "gas propellant chamber" generally refers to the structure housing part or all of the inlet assembly, the nuclear fuel chamber, and the exhaust assembly. The components of the gas propellant chamber may be physically connected and/or separated into two or more parts. Regardless, the gas propellant chamber is designed for continuous flow of the operating gas through the apparatus to allow the operating gas to be propelled at the conversion assembly and thus, in general, does not include significant physical or operational barriers beyond the main components themselves (e.g., compressor, turbine assembly, nuclear fuel chamber). That is, while the pressure and temperature of the operating gas increases along the gas propellant chamber, the operating gas generally does not experience pressure or temperature barriers between components defining distinct, sharp pressure differences between components. The pressure and temperature at the outlet of the compressor in the present apparatus satisfy the pressure and temperature requirements for the inlet of the nuclear fuel chamber and the nuclear fuel chamber is then designed so that the pressure and temperature at the outlet of the nuclear fuel chamber satisfy the velocity required at the inlet of the conversion assembly for a specific configuration. This more seamless approach results is an improvement in gas transportation through the apparatus (e.g., reduction in velocity losses across components, including pressure barriers). The more integrated system and seamless transition between components allows for a more compact and efficient system with fewer energy losses. For instance, additional connections between components (e.g., physical barriers, piping changes, stationary blades, etc.) may impose an energy loss (e.g., about 10-20% loss per component).

The gas propellant chamber is designed for operating gas to enter through the inlet assembly, be heated in the nuclear fuel chamber, and exit through the exhaust assembly at a higher velocity than when the operating gas entered the chamber. Accordingly, the operating gas is propelled out of the chamber to then directly impact a component for converting the kinetic energy to rotational energy (a "conversion assembly"), such as a turbine or propeller assembly. The components of the gas propellant chamber can be designed to accelerate the operating gas when exiting the nuclear power generation apparatus to the desired velocity. Due to the integration of the components in the gas propellant chamber, the system may experience a single temperature differential across the chamber (e.g., as opposed to different temperature requirements for the outlet of one component and the inlet of the succeeding component). In some embodiments, the temperature difference across the gas propellant chamber may be about 300 K to about 1000 K, such as about 350 K to about 900 K, about 400 K to about 800 K, about 400 K to about 600 K, or about 400 K to about 500 K. The temperature difference may be related to the length of the flow path through the gas propellant chamber. For instance, the flow path may be about 5 m to about 15 m, about 7 m to about 12 m, or about 8 m to about 10 m in length. The single temperature differential may reduce energy losses and increase efficiency.

The "nuclear fuel core," which may be generally referred to as the "fuel core," is housed in the "nuclear fuel chamber," which is part of the gas propellant chamber structure. The nuclear fuel core contains nuclear fuel elements including fissile material, such as uranium, plutonium, thorium, or a mixture thereof in the specific desired proportion.

The nuclear fuel chamber includes flow paths running longitudinally through the nuclear fuel chamber for the operating gas to flow through and transfer heat from the nuclear fuel elements to the operating gas. The flow paths are configured such that they run from one end of the nuclear fuel chamber to the other end of the nuclear fuel chamber. Other channels or openings with a variety of configurations or dimensions, in lieu of or in addition to the longitudinal paths, may also run through the nuclear fuel chamber for the operating gas to flow, and passages may also be included for the operating gas to flow around the fuel core.

In some embodiments, the nuclear fuel chamber may include helical or geometrical flow paths for the operating gas to travel through the nuclear fuel chamber. Such helical flow paths may be in lieu of, or in some cases, in addition to, longitudinal flow paths. Such helical flow paths may provide increased effective travel length through the chamber (and thus, increased heating per length of nuclear fuel core) while maintaining a compact chamber. Further, the helical flow paths may help maintain the velocity of the operating gas by maintaining the helical flow exiting the compressor. For instance, as the compressor is generally designed without stationary blades, the compressor results in a helical operating gas flow that can then be maintained in the nuclear fuel chamber. The helical or geometrical flow paths would be routed through the nuclear fuel core in a manner to achieve the most effective cooling of the fuel core. This may include a proportionally greater number of flow paths originating at the perimeter of the fuel core and then passing toward the center of the fuel core and having flow paths of varying diameters to increase the flow path in the hottest areas of the fuel core.

The nuclear fuel chamber may further incorporate a control system to control the nuclear reaction. For instance, the nuclear fuel elements can be manipulated to begin the nuclear fissioning process within the nuclear fuel chamber leading to a sustained nuclear reaction. The control elements may be manipulated to regulate the chain reaction within the nuclear fuel chamber, thereby regulating the energy produced by the apparatus. The nuclear fuel chamber can be designed to provide a sustained reaction that can continue for a period of years, subject to planned and unplanned stoppages. In some embodiments, the nuclear fuel chamber may be a fast spectrum reactor, which may offer a longer fuel life, a higher burn-up of nuclear fuel, and a more compact assembly. Further, in some embodiments, especially for space applications since gravitational forces are minimal, the nuclear fuel chamber may be designed to rotate with the blades of the conversion assembly, such as the rotating blades of a turbine or propeller assembly, and compressor of the inlet assembly. Such rotation may facilitate gas transportation and the rotating chamber would have a flywheel effect. Further, in some embodiments, two or more nuclear fuel cores (or fuel assemblies) may be clustered in one nuclear fuel chamber with a single drive shaft running through the center of the nuclear fuel chamber and connected to the compressor and the energy conversion assembly. In some embodiments, two or more gas propellant chambers may be contained on parallel axes in the containment vessel. In such clustered configurations, the nuclear fuel cores (or fuel assemblies) may be subcritical for transportation purposes and then become critical once at the desired site by neutronically connecting the clustered cores or chambers through a connecting medium. Various configurations of the nuclear fuel chamber and nuclear fuel elements are available as further discussed herein.

Contemporaneously with beginning the fissioning process in the nuclear fuel chamber, rotational thrust may be applied, such as via a motor or flywheel, to a rotational shaft ("drive shaft") to commence the rotation of certain components of the apparatus, such as one or more compressors, the blades of the turbine assembly, and one or more circulation fans.

The exhaust assembly of the gas propellant chamber can include a variety of components and may generally be designed to further increase the velocity of the operating gas exiting the nuclear fuel chamber. The exhaust assembly may also include a conversion assembly for directly capturing a significant portion of the kinetic energy and converting the energy into rotational energy and may further include components for converting the rotational energy into electricity. As will be discussed further below and shown in the accompanying figures, the exhaust assembly may include various components in a variety of configurations, such as a nozzle designed to further increase the velocity of the operating gas and/or one or more turbines in line with the nozzle, rotor/stator assemblies for directly converting the rotational energy into electricity within the exhaust assembly, etc.

Figure 4:
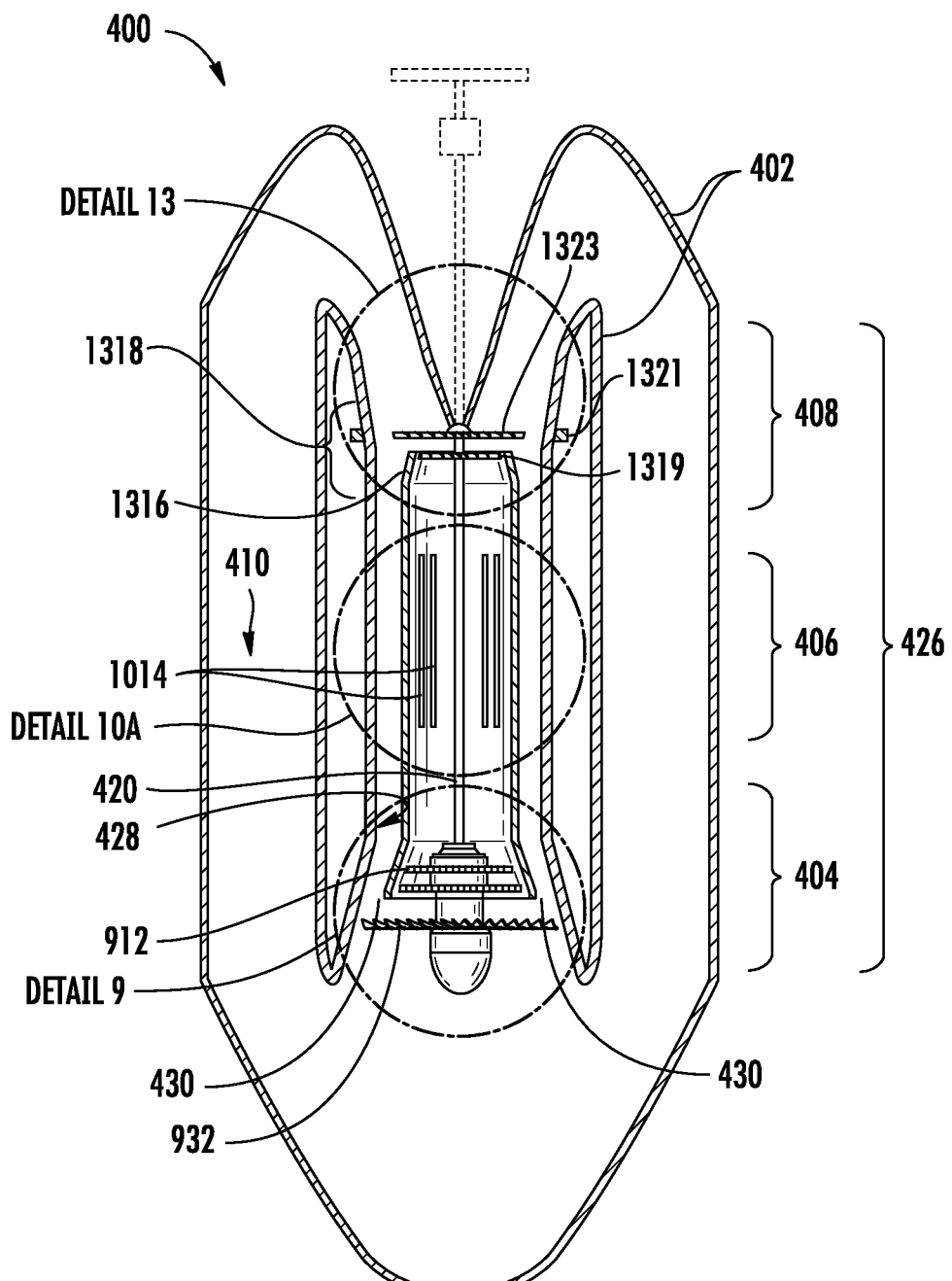
FIG. 4 illustrates a partial section view of a nuclear power generation apparatus having a circulation fan rotationally coupled to a compressor and an integrated conversion apparatus in accordance with some embodiments discussed herein.

The turbine assembly may include turbine blades disposed in an array around the drive shaft. As noted above, the turbine blades are generally designed to rotate during operation, rather than being an array of rotating and stationary blades as seen in some jet engines. An intricate array, including stationary blades, such as that seen in jet engines may not be workable because it may impede the flow of the working fluid exiting the turbine assembly such that the velocity of the working fluid is too slow to provide continued adequate circulation (gas transportation) through the containment vessel. More than one array of turbine blades may be used, such as seen in FIG. 4 and discussed in more detail below. FIG. 4 allows for continuous gas transportation while also integrating a stator belt within the containment vessel for generating electricity. The overall number and configuration of the turbine arrays may be limited by the dimensions of the system (e.g., total gas pathway length). The turbine assembly is generally designed to increase the speed of the turbine blades as the operating gas is propelled at the blades, leading to increased generation of energy. The turbine blades may be designed per the application and power rating of the apparatus, all of which may be used to design the nuclear fuel chamber. In some embodiments, magnetic bearings or other high-performance bearings (such as oil bearing with gas seals) may be utilized to minimize the friction. In some embodiments, the turbine blades may be angled and curved to optimize the turbine assembly's angular velocity based on the speed and angle at which the operating gas may be impacting the turbine blades, subject to other aerodynamic considerations. The shape and length of the turbine blades may also need to take into consideration the need to increase gas transportation, including gas transportation after exiting the turbine assembly (e.g., minimizing an unnecessary impediment of the gas flow, plus directing the operating gas through the circulation path). The turbine blades may differ radially to capture more energy efficiently.

In general, the focus of the design of the turbine assembly may be on increasing the rotation of the turbine blades. In contrast, traditional jet engines are based on taking a high rate of incoming air, accelerating the air along with the mass of the combustion products, which then provides thrust to the engine to propel the plane, with the trust being proportional to the mass of the material and the increase in mass velocity. In this regard, jet engines are designed to work in specific dynamic conditions (thus, requiring the production of thrust). A portion of the jet engine's heat energy is thus converted to useful work in propelling the plane forward but another typically significant portion is lost and dissipated into the atmosphere. However, in the present apparatus, the apparatus is generally stationary when in operation. That is, during operation, the components of the apparatus are moving, however, the apparatus, as a whole, is not moving, highlighting the requirement that the turbine in the apparatus be suitable in achieving the overall gas transportation requirements of the apparatus. Such distinction fundamentally changes how operating gas is transported through the apparatus. There are various other ways in which the operating requirements and parameters of jet engines would differ, such as the need for fuel economy and noise reduction in jet engines.

One or more components of the gas propellant chamber are generally nuclear qualified and suitable for high temperature operations as the apparatus provides high power density in a compact system. For instance, ceramic materials may be used for the components. The components may also be configured for sustaining high pressures, such as up to about 10 MPa, such as up to about 8 MPa. The nuclear qualified components may be certified to withstand radiation environments and be reliable and sufficiently sealed to prevent radioactivity releases. Materials may be selected to make sure there are no corrosion effects or other types of degradation.

In embodiments for generating electricity, for example, the apparatus will generally include a generator or similar component for converting rotational energy to electricity. The generator may be any suitable generator and may be incorporated into the apparatus in a variety of configurations. For instance, in some embodiments, electricity may be created using a generator downstream of the turbine or propeller assembly, while in some embodiments, a rotor/stator combination may be incorporated in the exhaust assembly. In some embodiments, the generator may be disposed outside of the containment vessel, while in some embodiments, the generator may be disposed within the containment vessel. Further, in some embodiments, the generator may be an electrostatic generator.

In some embodiments, the apparatus may include a containment vessel for housing one or more of the components of the apparatus. The containment vessel houses the gas propellant chamber and may provide a path for recirculation of the operating gas ("circulation path"). The containment vessel may be constructed of any suitable material and in any suitable configuration without deviating from the intent of the present disclosure. For instance, radioactive shielding may be included as needed throughout the containment vessel, such as in and around the nuclear fuel chamber. Further, in some embodiments, the containment vessel may have more than one layer, such as an inner containment vessel layer and an outer containment vessel layer. In some embodiments, it may be beneficial to have an outer containment vessel layer defining a vacuum around the inner containment vessel layer. For instance, an outer containment vessel may be included that operates at negative pressure while the inner containment vessel may have pressurized gas and, in some embodiments, may include piping to vent the gas.

The containment vessel may be a sealed structure and may contain the operating gas and the nuclear fuel chamber as well as other components of the apparatus. The containment vessel can be designed to comply with regulatory, safety, and security requirements, and may have any shape that complies with the above mentioned requirements, fulfills its purpose with regard to the configuration of the equipment therein, and satisfies other design parameters, such as operating gas transportation within the apparatus and incorporating the mechanics needed to cool the circulating operating gas such that when the operating gas enters the nuclear fuel chamber, the temperature of the operating gas has been lowered to the appropriate level.

For instance, the interior of the containment vessel may be shaped to facilitate the transportation and cooling of the gas within the structure. In some embodiments, the containment vessel may be designed to provide a circulation path of about two or three times the diameter of the path of the operating gas through the exhaust assembly and in some embodiments, the containment vessel may extend at least about 1 or 2 meters on either side of the exhaust assembly and the inlet assembly. That is, the circulation path may be significantly larger than the path of the operating gas through the gas propellant chamber, particularly through, the exhaust assembly. Accordingly, the operating gas may be cooled significantly when traveling through the circulation path back to the inlet assembly.

The containment vessel may also incorporate mechanisms for cooling the interior sides of the structure, may include cooling pipes in the interior of the containment vessel as further means for cooling the circulating gas thereby transferring some of the heat to secondary media, and may include additional passages for the operating gas to travel and cool down (e.g., through additional heat exchangers). The larger the temperature difference between the inlet assembly and the exhaust assembly, the more efficient the system will be. The operating gas may be cooled in the containment vessel through not just radiant cooling, which may be insufficient due to the large temperature differential required between the exhaust assembly and inlet assembly, but also through forced convection and conduction. In some embodiments, a cooling mechanism may be disposed between the inner and outer containment vessel layer such that operating gas traveling through the containment vessel may be cooled upon contact with the inner containment vessel layer (the outer containment vessel layer generally not being in contact with the operating gas). Circulation fans for facilitating the transportation of the operating gas through the structure may also be included in the containment vessel. The drive shaft for some of these fans may be coupled to the drive shaft for the compressor and turbine assembly to reduce energy losses. The apparatus can also be scaled depending on the uses required for the system and can be designed in either a large or a very small integral reactor-converter configuration.

The operating gas may be any suitable gas, such as air, argon, helium, carbon dioxide, or other suitable gas. For instance, the operating gas may include atmospheric gas in the environment on Earth, Mars, or other planets.

An inlet assembly is generally configured to draw operating gas into the nuclear fuel chamber and may do so by including various components such as one or more compressors, circulation fans, and other similar components. The inlet assembly may be shaped to draw operating gas into the nuclear fuel chamber and/or be positioned along the apparatus to increase the draw of operating gas into the nuclear fuel chamber. In some embodiments, a compressor may be added to the inlet assembly to direct the operating gas to the nuclear fuel chamber and further increase the pressure of the operating gas, thereby increasing the efficiency of the apparatus. A compressor to compress the operating gas entering the inlet assembly may be positioned in the inlet assembly with a drive shaft. The drive shaft may run through a channel in the nuclear fuel chamber thereby connecting the compressor to a conversion assembly. Coupling the drive shaft to the compressor and conversion assembly through the nuclear fuel chamber allows the power from the conversion assembly (e.g., turbine assembly) to directly rotate the compressor, thereby minimizing the energy losses resulting from using a different power source. Unlike prior systems, the drive shaft couples the compressor and conversion assembly through the nuclear fuel chamber. Coupling of the components through the nuclear fuel chamber provides a fully integrated system and improves gas transportation through the apparatus and allows for smaller overall dimensions. A variety of configurations of a compressor may be used, as will be discussed further, such as an axial compressor or centrifugal compressor. The compressor may have one or more stages of compressor blades, though with each stage, the compressor blades are generally configured to rotate during operation. That is, the compressor is generally designed to not include stationary blades, which may impede the flow of the operating gas through the apparatus, reducing the velocity of the gas and also resulting in energy losses. In this regard, a diffuser may also not be used with the compressor as a diffuser may impede the flow through the compressor and reduce the velocity of the operating gas through the apparatus. The compressor in the present apparatus may be integrated with the other components in the gas propellant chamber to provide a seamless operating transition between components.

In some embodiments, the apparatus may include heat extraction passages to process heat for commercial or other purposes. In addition to such heat extraction passages, it may be beneficial to include heat exchangers for process or district heat in cases where the operating gas is not inert or the containment vessel is a closed vessel. The heat exchanger may also aid in cooling the gas as it circulates.

In some embodiments, the apparatus may include one or more circulation fans to facilitate gas transportation through the structure. The circulation fans may be connected or coupled to a drive shaft of the apparatus connecting various components of the apparatus. By coupling the circulation fan to the conversion assembly and the compressor through the nuclear fuel chamber, the addition of the circulation fan provides improved gas transportation while not requiring a separate power supply to power the circulation fan.

Bypasses may also be included in the apparatus to bypass the nuclear fuel chamber. In this regard, a circulation fan may be included to direct operating gas to the bypass (as well as to the nuclear fuel chamber) by positioning the circulation fan upstream of both the inlet to the nuclear fuel chamber and the bypasses. Bypasses may provide cooling, and thus, better control, of the nuclear fuel chamber as well as improve gas transportation (and gas velocity) through the apparatus. The bypass allows for a greater operating gas volume and may be unrestricted or only partially restricted through the gas propellant chamber to aid in gas transportation through the apparatus, including the circulation path.

Various other components may be included throughout the apparatus such as cooling pipes, flywheels, wiring, sensors, controls, etc. For instance, in some embodiments, the apparatus may incorporate a flywheel, which may be coupled to or otherwise in communication with the energy conversion assembly, a generator or similar apparatus. The dimensions and configuration of the flywheel can be determined by several factors, such as the flywheel's expected angular velocity. In some embodiments, the flywheel may be supported and stabilized by magnetic bearings or other high-performance bearings to minimize surface friction. The flywheel may incorporate, to the extent feasible, the current state of the art for high-performance flywheels in the design and integration of the flywheel in the apparatus. The flywheel may provide flexibility to the overall design and provide backup electrical generation, as well as augment the rotational energy provided to rotate certain components of the apparatus such as the compressor or fan. The flywheel may also offer an added safety benefit to the apparatus since the flywheel can be engaged if needed to continue the circulation of the operating gas in the event the fuel core needs to be shutdown. The flywheel also offers the advantage of using or storing renewable-fuel-generated electricity, especially during peak production times for such fuel. The flywheel may be housed in a vacuum chamber. In some embodiments, the flywheel may be incorporated into the containment vessel along with the inlet assembly, nuclear fuel chamber, and exhaust assembly.

The flywheel, as well as the generator, may offer the opportunity to begin the initial rotation of the operating gas in the apparatus by engaging and spinning the blades of the conversion assembly or any similar apparatus, and potentially the spinning of one or more compressors and/or fans disposed at the inlet assembly of the gas propellant chamber.

In some embodiments, the apparatus can serve as a motor with a drive shaft used to provide mechanical energy. For instance, the drive shaft can be attached to a propeller or other propulsion assembly. For example, the apparatus could be used in a submarine to power the propeller for propulsion, while also generating electricity and district heating for use on board the submarine.

The apparatus is suitable to operate regardless of external environments (including on the moon or other planets), and with or without utilizing the ambient gas in such environments as the system's operating gas. In some embodiments, the apparatus may be designed to operate underground or underwater. For instance, the apparatus may be submerged under water. Such underground or submerged configurations may provide safety and security benefits. Further, the present apparatus has significant potential for space power production, especially since in outer space the cooling issues would be minimal.

In some embodiments, two or more apparatuses could be sited at one location to share certain of the infrastructure and staffing at the location, as a multi-unit plant.

In some embodiments, the present apparatus may include a nuclear fuel core integrated with one or more components traditionally found in a jet engine (e.g., a turbofan, turbojet or ramjet, as well as other types that may be later conceived or developed) adapted for the present apparatus. For instance, in some embodiments, diffusers, which may be found in some jet engines, may not be needed and may, instead, create drag by decreasing the velocity of the operating gas.

The operating gas exiting the nuclear fuel chamber can be used to generate electricity by various components. For instance, as discussed further below, one or more turbines, nozzles, blade assemblies, propellers, etc. may be used to capture the kinetic energy from the operating gas and convert such to rotational energy. Various configurations may be used without deviating from the intent of the present disclosure. For instance, the operating gas may be directed at and rotate the blades of a propeller assembly in proximity to the exhaust assembly. A turbine or propeller assembly may be in communication with a generator or other apparatus for converting the rotation of the shaft or other component(s) of the propeller assembly to electricity, such as a stator and rotor assembly. In some embodiments, the generator may be integrated, wholly or partially, into the conversion assembly.

As shown herein, the present apparatus addresses significant challenges of gas transportation and cooling. Other apparatuses have been concerned with transportability of the apparatus, which means segmenting the components or modules for transportation purposes and ensuring that the modules meet dimensions of a cargo unit or trailer. As a result, the challenges of gas transportation and cooling cannot be adequately addressed within these prior configurations. Transporting the present apparatus may be improved by controlling the pressure of the system, adding absorbers, and various other methods. For instance, the containment vessel may be installed onsite and then the gas propellant chamber may be added thereto. In addition, the fully integrated approach of the present apparatus allows for smaller dimensions than those of other transportable apparatuses if such other apparatuses were adapted to adequately address gas transportation and cooling.

FIG. 1 illustrates a partial section view of a nuclear power generation apparatus in accordance with some embodiments discussed herein. In particular, FIG. 1 illustrates a nuclear power generation apparatus 100 comprising a containment vessel 102 housing a gas propellant chamber 126 which includes an inlet assembly 104, nuclear fuel chamber 106, and exhaust assembly 108. The gas propellant chamber 126 has an annular body. The containment vessel 102 also defines a circulation path 110 for the operating gas to flow in the closed system. As shown in FIG. 1, in this embodiment, the inlet assembly 104 includes a compressor 712, such as an axial compressor as illustrated in FIG. 1, disposed in the inlet port or first end of the annular body of the gas propellant chamber 126. In the embodiment illustrated in FIG. 1, the inlet port of the annular body of the gas propellant chamber 126 has a cross section that decreases along the length of the inlet port where the compressor 712 is disposed. Such restriction in the cross section may help to compress the operating gas to be directed to the nuclear fuel chamber. The nuclear fuel chamber includes nuclear fuel elements 1014, and the exhaust assembly 108 includes a nozzle 616 and a turbine assembly 618. The nozzle 616 forms the exhaust port or the second end of the annular body of the gas propellant chamber 126. The nozzle may restrict the flow area of the operating gas to increase the velocity of the gas. The flow of the operating gas exiting the nuclear fuel chamber drives the turbine assembly. The compressor 712 is rotationally connected to the turbine assembly 618 by the drive shaft 120 and is driven by the drive shaft's rotation. The turbine assembly 618 is also connected to a generator 122, shown schematically, and a flywheel 124.

In the embodiment illustrated in FIG. 1, the compressor 712, turbine assembly 618, generator 122, and flywheel 124 rotate along a single axis. However, in other embodiments, one or more of the components may rotate along different axes. For instance, in some embodiments, it may be desired to have the flywheel 124 rotate along an axis different than that of the compressor 712 and turbine assembly 618.

In the foregoing configuration, the location of the blades of the turbine assembly in relationship to the outlet of the nuclear fuel chamber may be determined by several parameters, such as the velocity and temperature of the operating gas at certain distances from the outlet of the nuclear fuel chamber. The blades may span partially, or alternatively entirely, the inner circumference of the containment vessel at the point where the operating gas contacts the blades, depending on the specific configuration of the blades, the specific configuration of the apparatus and its other components (including the circulation path) and the specific gas transportation requirements of the specific apparatus configuration. Magnetic bearings or other high-performance bearings may be utilized to minimize the surface friction at the base of the spinning blades of the turbine assembly and to maximize the angular velocity of the blades.

Figure 14:
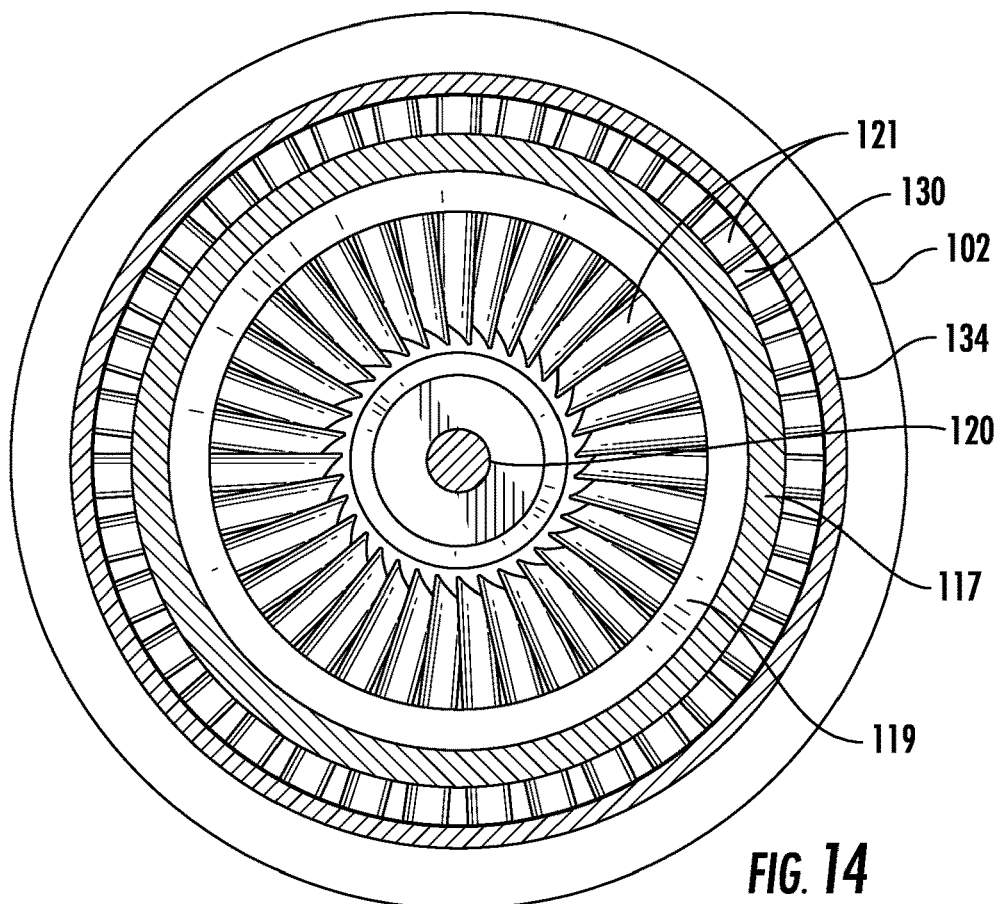
FIG. 14 illustrates a cross-section of the exhaust assembly nozzle along line 14-14 shown in FIG. 1 in accordance with some embodiments discussed herein.

FIG. 14 illustrates a cross-section of the exhaust assembly nozzle along line 14-14 shown in FIG. 1 in accordance with some embodiments discussed herein. In particular, FIG. 14 illustrates the shaft 120, turbine blades 121 of the turbine assembly 618, interior of the nozzle 119, cross-section of the nozzle wall 117, bypass 130 (along line 14-14, the bypass opens to the turbine blades 121 of the turbine assembly 618), cross section of the containment vessel 134, and containment vessel 102 along the cross-section line 14-14 of FIG. 1.

In the embodiment illustrated in FIG. 1, a bypass 130 is disposed between the gas propellant chamber 126 and the inner wall 128 of the containment vessel. As will be seen in other embodiments, the bypass 130 may be enlarged and may incorporate a fan upstream of the bypass to force operating gas through the bypass. The bypass may allow for cooling of the nuclear fuel chamber 106 to avoid overheating of the nuclear power generation apparatus 100. The bypass may be modified as needed to achieve this and other benefits or eliminated in certain configurations to achieve other benefits.

As the operating gas exits the turbine assembly 618, the gas is released into the containment vessel 102 for traveling along circulation path 110 back to the inlet assembly 104. As shown in FIG. 1, downstream of the turbine assembly 618, the containment vessel 102 widens allowing for a reduction in pressure and temperature in the operating gas. That is, the circulation path 110 defined by the containment vessel 102 has a first diameter and a second diameter, the second diameter being larger than the first diameter and disposed downstream of the first diameter. Such is the case with each of the embodiments shown in FIGS. 1-5 and 16. In particular, the significant expansion and reduction in pressure of the operating gas after it passes the turbine assembly 618 and is dispersed into the significantly greater volume of the containment vessel 102 may assist in cooling of the operating gas. Further, the blades of the turbine assembly 618 included in the apparatus may be configured in a way to aid the dispersion of the operating gas, including into the expanded area of the circulation path. The containment vessel 102 may include other components to cool the gas, such as the inner wall 128 being cooled externally, cooling pipes located in the interior of the containment vessel 102, or a combination thereof as well as other cooling mechanisms.

Figure 6:
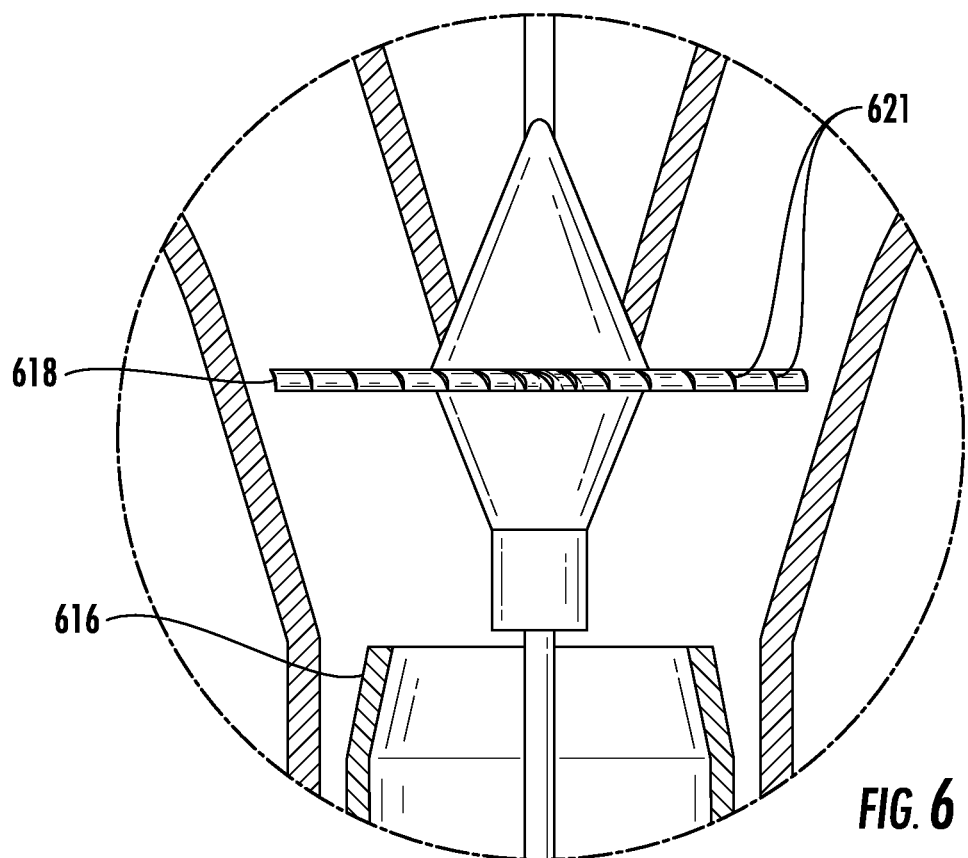
FIG. 6 illustrates a detail view of an exhaust assembly in accordance with some embodiments discussed herein.
Figure 7:
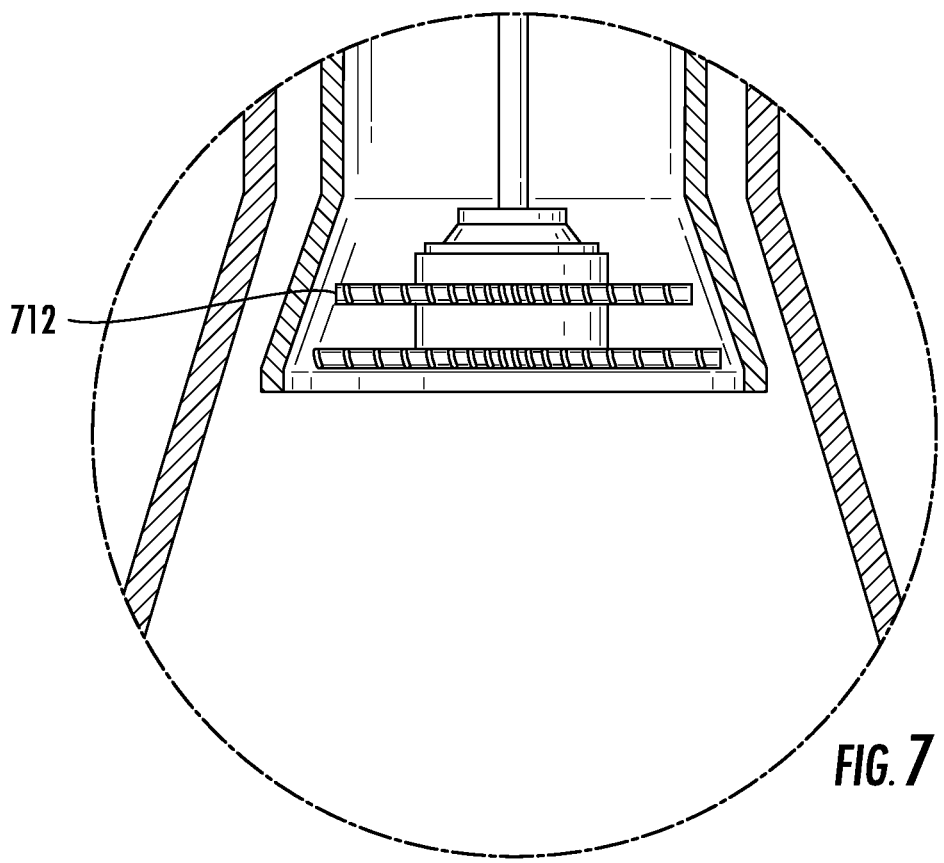
FIG. 7 illustrates a detail view of an axial compressor inlet assembly in accordance with some embodiments discussed herein.
Figure 10A:
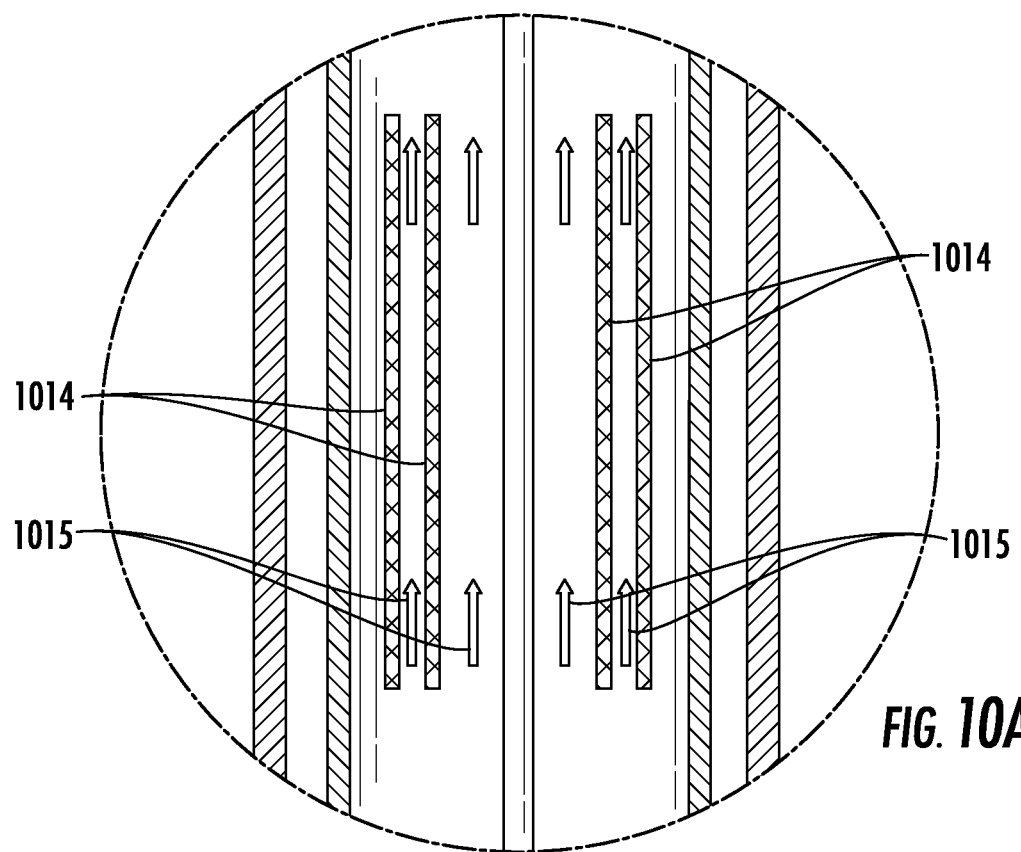
FIG. 10A illustrates a detail view of a nuclear fuel chamber in accordance with some embodiments discussed herein.

Details of the inlet assembly 104, nuclear fuel chamber 106, and exhaust assembly 108 are provided in FIGS. 7, 10A, and 6, respectively. For instance, FIG. 7 illustrates a detail view of an axial compressor inlet assembly in accordance with some embodiments discussed herein. In particular, FIG. 7 illustrates a detail view of compressor 712. The compressor 712 is connected to the downstream components by a drive shaft (e.g., 120 in FIG. 1). FIG. 10A illustrates a detail view of a nuclear fuel chamber in accordance with some embodiments discussed herein. In particular, FIG. 10A illustrates the nuclear fuel elements 1014 with flowpath 1015 showing the flow of operating gas around and through the nuclear fuel elements 1014. FIG. 6 illustrates a detail view of an exhaust assembly and turbine assembly in accordance with some embodiments discussed herein. In particular, FIG. 6 illustrates nozzle 616 and turbine assembly 618 as well as the drive shaft (e.g., 120 in FIG. 1) connecting the upstream inlet assembly components to the turbine assembly 618.

Figure 8:
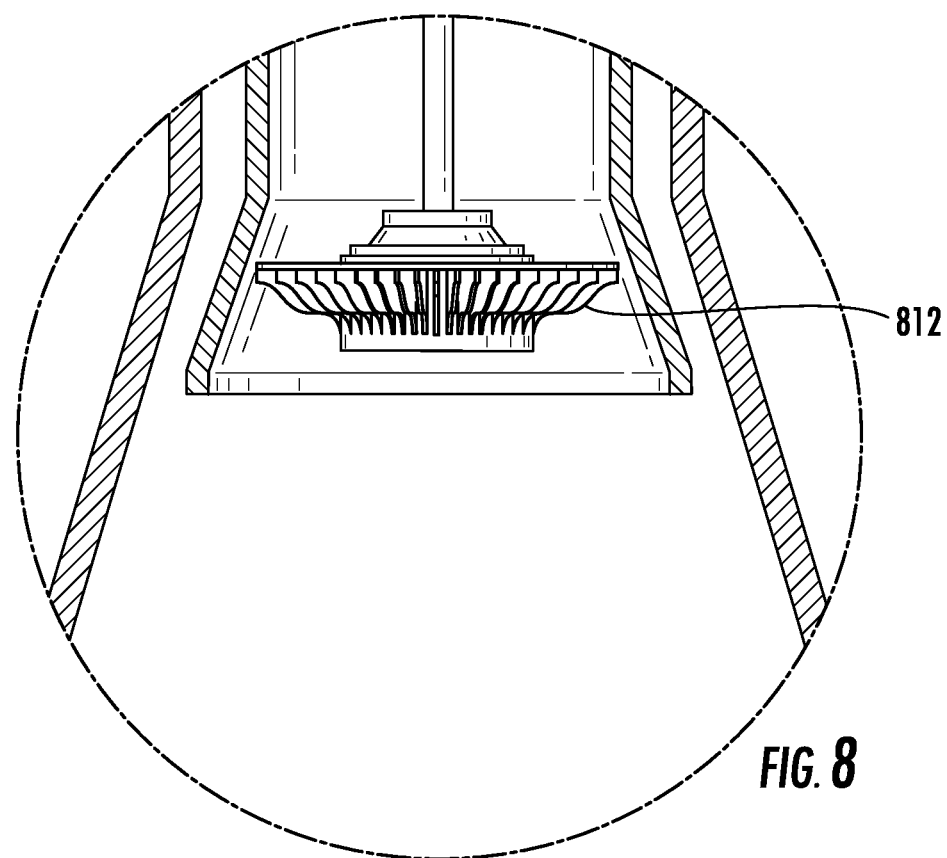
FIG. 8 illustrates a detail view of a centrifugal compressor inlet assembly in accordance with some embodiments discussed herein.

In some embodiments, the inlet assembly 104, nuclear fuel chamber 106, and exhaust assembly 108 may include other components and/or configurations without deviating from the intent of the present disclosure. For instance, in some embodiments, a centrifugal compressor, such as the centrifugal compressor 812 shown in FIG. 8 may be used instead of the axial compressor 712 shown in FIG. 1 and FIG. 7. In particular, FIG. 8 illustrates a detail view of a centrifugal compressor 812 inlet assembly in accordance with some embodiments discussed herein. The centrifugal compressor 812 is connected via drive shaft (e.g., 120 in FIG. 1) to the downstream components. The centrifugal compressor 812 is connected to the downstream components, such as turbine assembly 618 via a drive shaft. A centrifugal compressor may provide for a larger intake area thereby improving efficiency. Such larger intake area becomes particularly important in stationary systems (as compared, for example, to the intake area of jet engines on a plane in a flight).

Unlike traditional jet engines, the present apparatus is generally stationary (though the apparatus and/or certain components may be movable in certain embodiments). The emphasis in the present apparatus is on axial velocity rather than thrust. Thus, the present apparatus may not need certain components traditionally found in jet engines, such as both a high pressure compressor and a low pressure compressor. Further, the compressors may not need diffusers, as such may create drag on the gas flow in the apparatus. The apparatus may be a closed system or an open system using ambient gas similar to jet engines.

Figure 9:
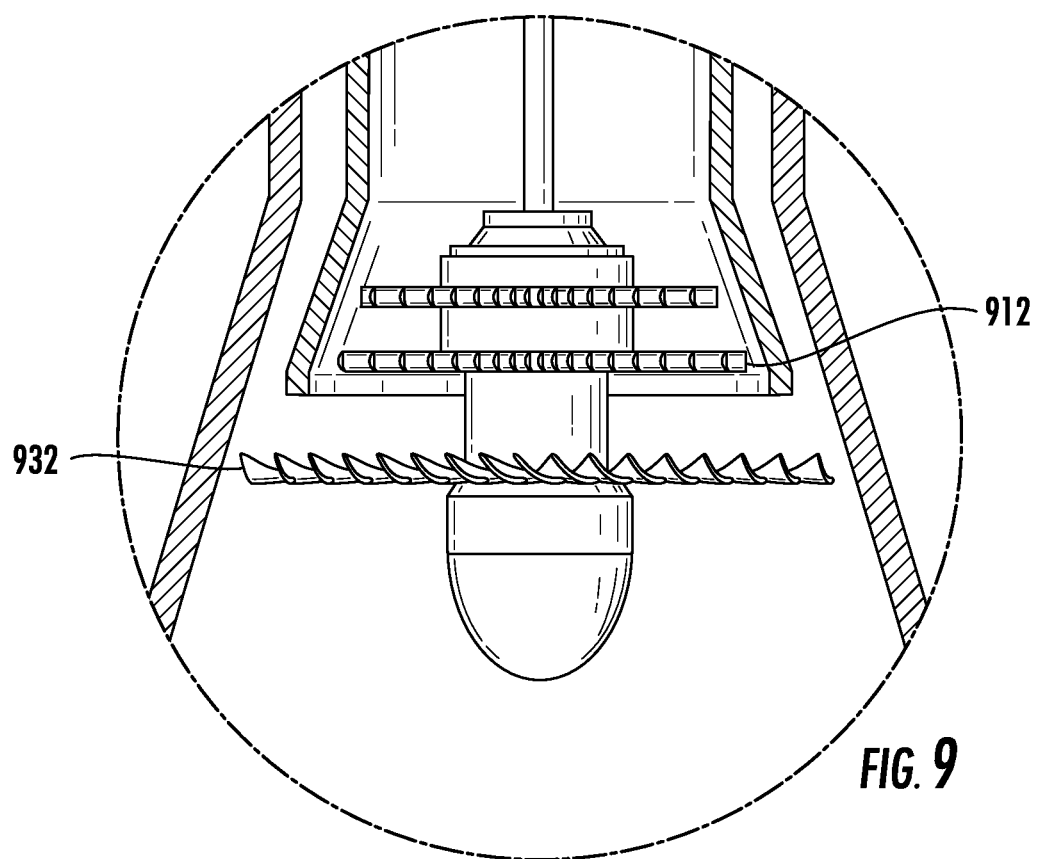
FIG. 9 illustrates a detail view of a circulation fan and compressor inlet assembly in accordance with some embodiments discussed herein.

As noted above, the embodiment illustrated in FIG. 1 shows a bypass 130. In some embodiments, a fan, such as fan 932 shown in FIG. 9, may be added upstream of the compressor to further direct the operating gas into the gas propellant chamber 126 and/or the bypass 130. As noted above, the bypass 130 may allow for cooling and thus regulation of the nuclear fuel chamber. In such embodiments, the assembly shown in FIG. 9 may be incorporated into the nuclear power generation apparatus 100 instead of the inlet assembly 104 shown in FIG. 1. In particular, FIG. 9 illustrates a detail view of a fan 932 and compressor 912 connected to the downstream components by a drive shaft (e.g., 120 in FIG. 1) in accordance with some embodiments discussed herein.

Figure 10B:
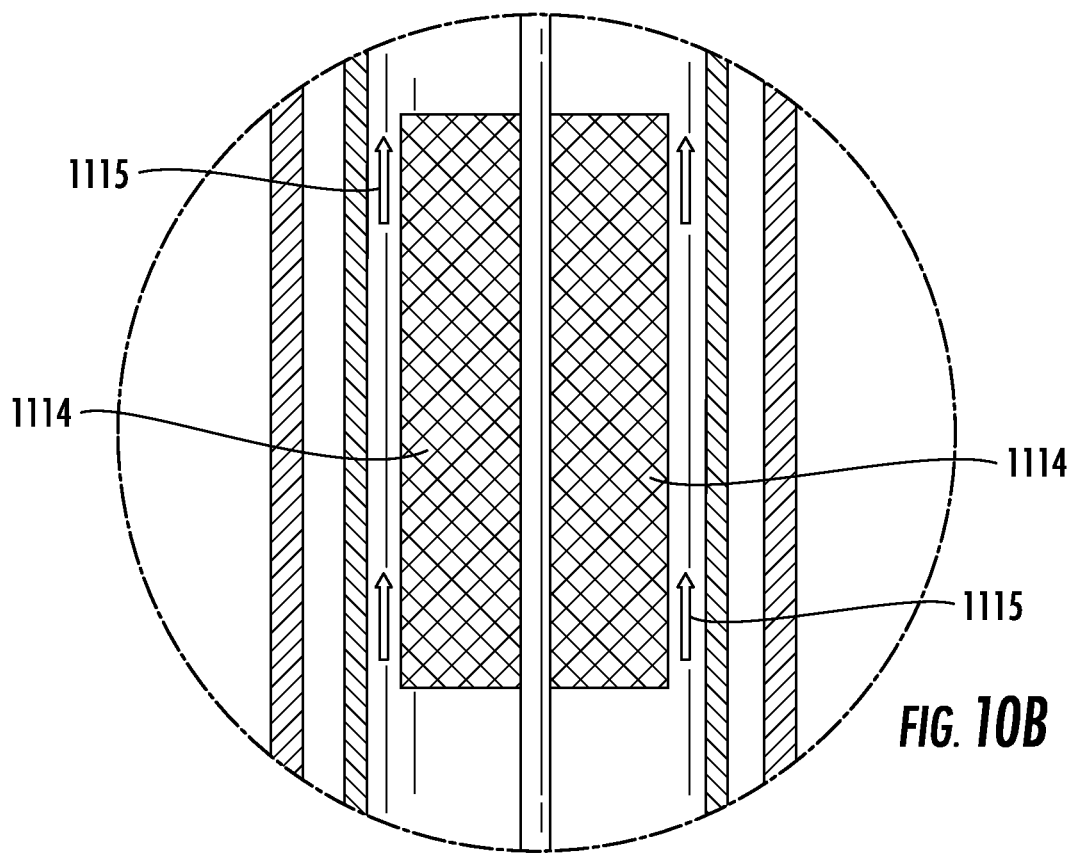
FIG. 10B illustrates a detail view of a nuclear fuel chamber in accordance with some embodiments discussed herein.

In the embodiment illustrated in FIG. 1, the operating gas flows around and in between nuclear fuel elements. Such configuration is further illustrated in FIG. 10A. In some embodiments, the nuclear fuel elements may be configured such that the operating gas flows around the elements, instead of between elements. For instance, in some embodiments, the nuclear fuel elements 1114 of FIG. 10B may be used instead of the configuration shown in FIG. 1 allowing the operating gas to flow around the nuclear fuel elements 1114 in flowpath 1115. In particular, FIG. 10B illustrates a detail view of a fuel core in accordance with some embodiments discussed herein. Further, in some embodiments, the nuclear fuel elements may be arranged in a fuel element lattice (i.e., fuel elements arrayed in a geometric matrix) designed to optimize the operating parameters desired for the present apparatus. Flow channels for the operating gas may extend through the lattice. Variations on the configuration of the nuclear fuel elements and nuclear fuel chamber may be available without deviating from the intent of the present disclosure.

Figure 12:
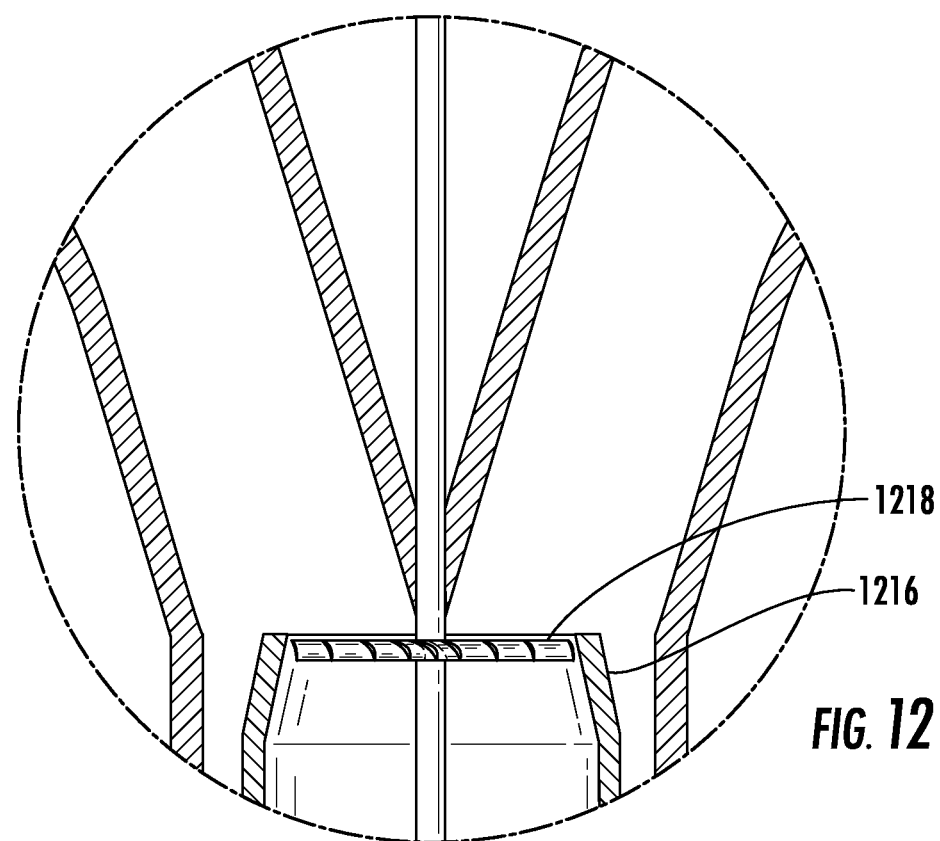
FIG. 12 illustrates a detail view of an exhaust assembly in accordance with some embodiments discussed herein.

In the embodiment illustrated in FIG. 1, the exhaust assembly 108 includes a nozzle 616. In some embodiments, the exhaust assembly 108 may be modified to resemble the detail image shown in FIG. 12 where a turbine assembly 1218 is in line with the exit of the nozzle 1216. FIG. 12 illustrates a detail view of an exhaust assembly and turbine assembly in accordance with some embodiments discussed herein. The turbine assembly 1218 is connected to a drive shaft (e.g., 120 in FIG. 1) which is connected upstream to the inlet assembly components. Such positioning of the turbine assembly 1218 in line with the nozzle 1216 may decrease the size of the apparatus allowing for a more compact design and may improve the efficiency of the apparatus in some embodiments.

Figure 13:
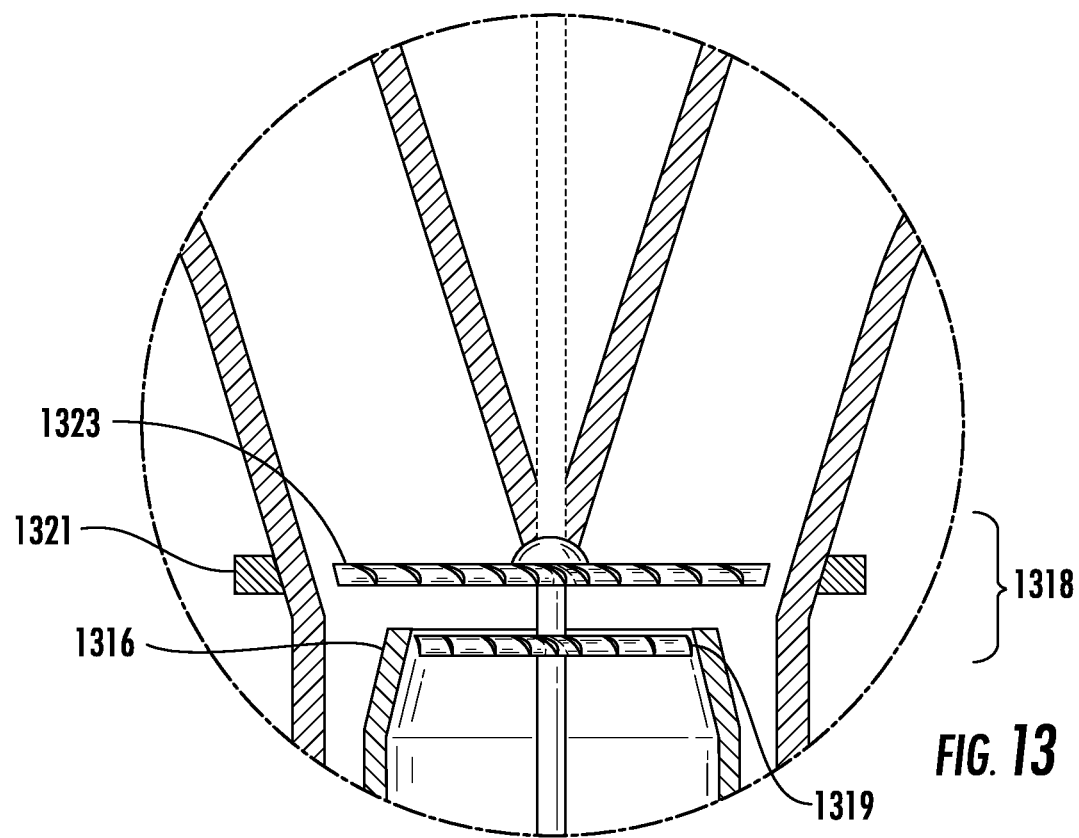
FIG. 13 illustrates a detail view of an exhaust assembly in accordance with some embodiments discussed herein.

Further, in some embodiments, the exhaust assembly 108 may be modified to resemble the detail image shown in FIG. 13 where the turbine assembly 1318 includes a first turbine 1319 in line with the exit of the nozzle 1316 and connected to a drive shaft (e.g., 120 in FIG. 1) which is connected upstream to the inlet assembly components. The turbine assembly 1318 includes a second turbine 1323 in communication with a stator belt 1321 and connected to the shaft 1320 to convert kinetic energy to rotational energy and then to electricity through the rotor/stator combination. Such configuration may reduce the size of the design by including the generator in the apparatus and may improve the efficiency of the apparatus in some embodiments. The dotted lines shown in FIG. 13 indicate that an additional generator and/or flywheel may be included in some embodiments.

Figure 2:
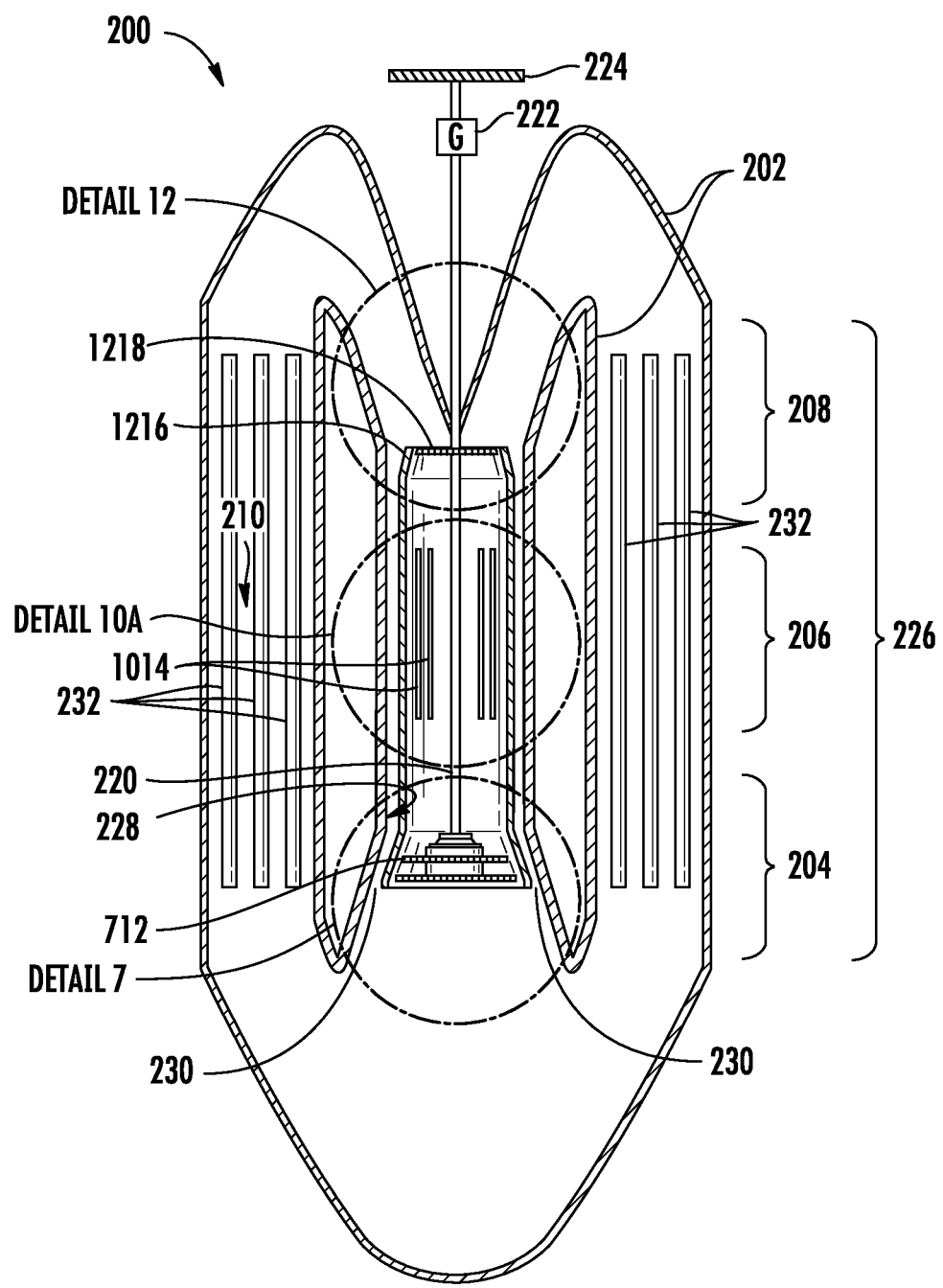
FIG. 2 illustrates a partial section view of a nuclear power generation apparatus having an integrated conversion apparatus and exhaust assembly in accordance with some embodiments discussed herein.

FIG. 2 illustrates a partial section view of a nuclear power generation apparatus in accordance with some embodiments discussed herein. In particular, FIG. 2 illustrates a nuclear power generation apparatus 200 comprising a containment vessel 202 housing a gas propellant chamber 226 which includes an inlet assembly 204, nuclear fuel chamber 206, and exhaust assembly 208. The containment vessel 202 also defines a circulation path 210 for the operating gas to circulate in the closed system. As shown in FIG. 2, in this embodiment, the inlet assembly 204 includes a compressor 712, such as an axial compressor as illustrated in FIG. 2, disposed in the inlet port or first end of the annular body of the gas propellant chamber 226. In the embodiment illustrated in FIG. 2, the inlet port of the annular body of the gas propellant chamber 226 has a cross section that decreases along the length of the inlet port where the compressor 712 is disposed. Such restriction in the cross section may help to compress the operating gas to be directed to the nuclear fuel chamber. The nuclear fuel chamber 206 includes nuclear fuel elements 1014, and the exhaust assembly 208 includes a nozzle 1216 and a turbine assembly 1218. The nozzle 1216 forms the exhaust port or the second end of the annular body of the gas propellant chamber 226. The compressor 712 is connected to the turbine assembly 1218 by a shaft 220. The turbine assembly 1218 is also connected to a generator 222, shown schematically, and a flywheel 224.

In the embodiment illustrated in FIG. 2, the containment vessel 202 includes cooling pipes 232 disposed along the circulation path 210 for cooling the operating gas prior to re-entry into the inlet assembly 204. FIG. 2 illustrates one configuration of the cooling pipes 232, however, various configurations are available without deviating from the intent of the present disclosure. For instance, one or more cooling pipes 232 may be disposed in smaller sections or multiple sections along the flow path to improve the cooling and gas transportation of the operating gas through the apparatus.

As noted in the description of FIG. 1 and shown in FIG. 2, the compressor 712, turbine assembly 1218, generator 222, and flywheel 224 rotate along the same axis. However, in other embodiments, one or more of the components may rotate along a different axis. For instance, in some embodiments, it may be desired to have the flywheel 224 rotate along an axis different than that of the compressor 712 and turbine assembly 1218.

Also as noted with respect to FIG. 1, in the embodiment illustrated in FIG. 2, a by-pass is disposed between the gas propellant chamber 226 and the inner wall 228 of the containment vessel. As will be seen in other embodiments, the bypass 230 may be enlarged and may incorporate a fan upstream of the bypass to force operating gas through the bypass, such as the fan 932 shown in FIG. 9. The bypass may allow for cooling of the nuclear fuel chamber 206 to avoid overheating of the nuclear power generation apparatus 200. The bypass may be modified as needed to achieve this and other benefits or eliminated in certain configurations to achieve other benefits.

Details of the inlet assembly 204, nuclear fuel chamber 206, and exhaust assembly 208 are provided in FIGS. 7, 10A, and 12, respectively. However, the components in the inlet assembly 204, nuclear fuel chamber 206, and exhaust assembly 208 may be modified to resemble the components shown in the detail views of FIGS. 8-9, 10B, and 13 in various combinations. For instance, an axial compressor or a centrifugal compressor, with or without a fan, may be used in the embodiment illustrated in FIG. 2 as shown in FIGS. 7-9. In addition, nuclear fuel elements shown in FIGS. 10A and 10B may alternatively be used in the nuclear fuel chamber 206. Further, the exhaust assembly may include nozzles, turbines, and/or rotor/stator combinations as shown in FIGS. 6 and 13.

Figure 3:
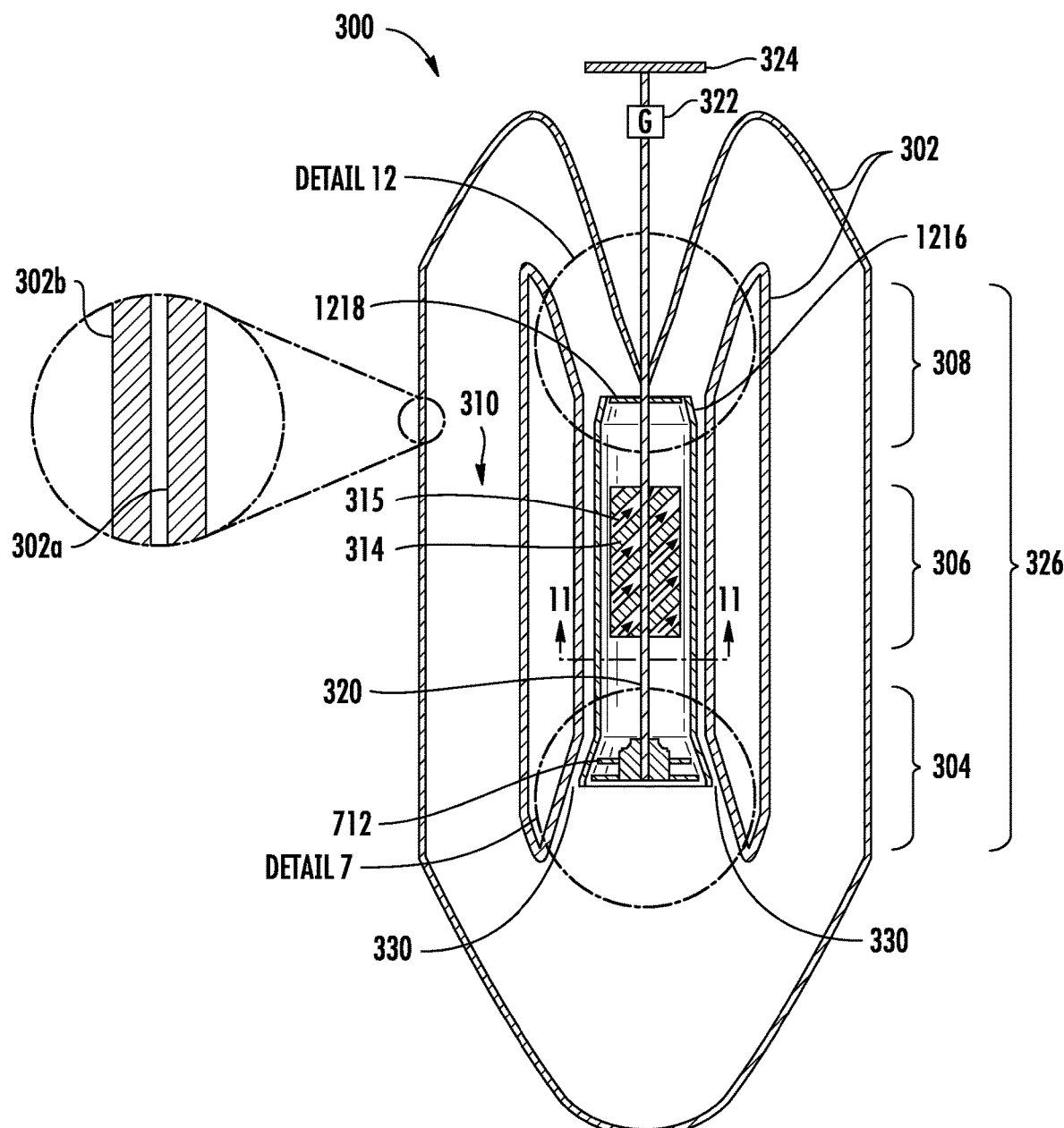
FIG. 3 illustrates a section view of a nuclear power generation apparatus having a nuclear fuel chamber including helical flow paths in accordance with some embodiments discussed herein.

FIG. 3 illustrates a section view of a nuclear power generation apparatus in accordance with some embodiments discussed herein. In particular, FIG. 3 illustrates a nuclear power generation apparatus 300 comprising a containment vessel 302 housing a gas propellant chamber 326 which includes an inlet assembly 304, nuclear fuel chamber 306, and exhaust assembly 308. The containment vessel 302 also defines a circulation path 310 for the operating gas to flow in the closed system. As shown in FIG. 3, in this embodiment, the inlet assembly 304 includes a compressor 712, such as an axial compressor as illustrated in FIG. 3, disposed in the inlet port or first end of the annular body of the gas propellant chamber 326. In the embodiment illustrated in FIG. 3, the inlet port of the annular body of the gas propellant chamber 326 has a cross section that decreases along the length of the inlet port where the compressor 712 is disposed. Such restriction in the cross section may help to compress the operating gas to be directed to the nuclear fuel chamber. The exhaust assembly 308 includes a nozzle 1216 and a turbine assembly 1218. The nozzle 1216 forms the exhaust port or the second end of the annular body of the gas propellant chamber 326. The compressor 712 is connected to the turbine assembly 1218 by a shaft 320. The turbine assembly 1218 is also connected to a generator 322, shown schematically, and a flywheel 324.

In the embodiment illustrated in FIG. 3, the containment vessel 302 is of a double-wall construction with a first surface 302a and a second surface 302b, the first surface being disposed between the second surface 302b and the circulation path 310. In some embodiments, a cooling mechanism, such as a heat exchanger or coolant may be present between the first surface 302a and the second surface 302b. In some embodiments, the pressure of the area between the first surface 302a and the second surface 302b may be different than the pressure of the circulation path 310. For instance, the first surface 302a may be defined by an inner containment vessel layer and the second surface 302b may be defined by an outer containment vessel layer. A cooling mechanism may be disposed between the two vessel layers. A vacuum may be established between the two vessel layers. Various modifications can be made without deviating from the intent of the present disclosure.

In the embodiment illustrated in FIG. 3, the nuclear fuel chamber 306 includes interior flow paths 315 disposed in a spiral or helical configuration such that the operating gas continues traveling in a spiral path after exiting the compressor. In particular, the nuclear fuel chamber 306 includes interior flow paths 315 adjacent to nuclear fuel elements 314 such that the operating gas continues traveling on the spiral or helical path initiated by the compressor. Accordingly, any loss in rotational momentum due to the operating gas changing to a straight path may be mitigated. The helical flow paths may minimize drag at the nuclear fuel chamber inlet and outlet while also maintaining a spiral flow to optimize the speed and angle of impact of the operating gas when striking the turbine blades. FIG. 3 illustrates a section view to show the inside of the fuel-core chamber. While the nuclear fuel chamber 306 is stationary in FIG. 3, in some embodiments, the nuclear fuel chamber 306 may rotate along the shaft 320 along with the compressor 712 and turbine assembly 1218.

The spiral configuration of the interior flow paths 315 allows the gas to spiral through the nuclear fuel chamber 306 to keep the gas moving through the apparatus. Such configuration may allow the interior flow paths 315 to more evenly distribute heat to gas. The spiral configuration may also allow for a reduced size of the nuclear fuel chamber while maintaining a long contact path between the operating gas and the fuel core.

As shown in FIG. 3, the nuclear fuel chamber 306 includes interior flow paths 315 disposed in a spiral or helical configuration. To form the spiral or helical flow path, the nuclear fuel chamber 306 may include fuel elements with helical groves, helically shaped elements with gas passages, graphite or metal blocks with helical passages, or imbedded fuel as well as a liquid fuel tank with helical pipes following the needed flow shape. Various methods of forming the spiral or helical flow path can be implemented taking advantage of all reactor core designs and developing new reactor core designs—e.g., molten salt cores and solid cores.

As noted in the description of FIG. 1 and shown in FIG. 3, the compressor 712, turbine assembly 1218, generator 322, and flywheel 324 rotate along the same axis. However, in other embodiments, one or more of the components may rotated along a different axis. For instance, in some embodiments, it may be desired to have the flywheel 324 rotate along an axis different than that of the compressor 712 and turbine assembly 1218.

Also as noted with respect to FIG. 1 and shown in the embodiment illustrated in FIG. 3, a bypass is disposed between the gas propellant chamber 326 and the inner wall 328 of the containment vessel. In some embodiments, the bypass 330 may be enlarged and may incorporate a fan upstream of the bypass to force operating gas through the bypass, such as the fan 932 shown in FIG. 9. The bypass may allow for cooling of the nuclear fuel chamber 306 to avoid overheating of the nuclear power generation apparatus 300. The bypass may be modified as needed to achieve this and other benefits or eliminated in certain configurations to achieve other benefits.

Details of the inlet assembly 304 and exhaust assembly 308 are provided in FIGS. 7 and 12, respectively. However, the components in the inlet assembly 304 and exhaust assembly 308 may be modified to resemble the components shown in the detail views of FIGS. 6, 8-9, and 13. For instance, an axial compressor or a centrifugal compressor, each with or without a fan, may be used in the embodiment illustrated in FIG. 3. When a centrifugal compressor is used, no diffuser may be needed. Further, the exhaust assembly may include nozzles, turbines, and/or rotor/stator combinations as shown in FIGS. 6 and 13.

Figure 11:
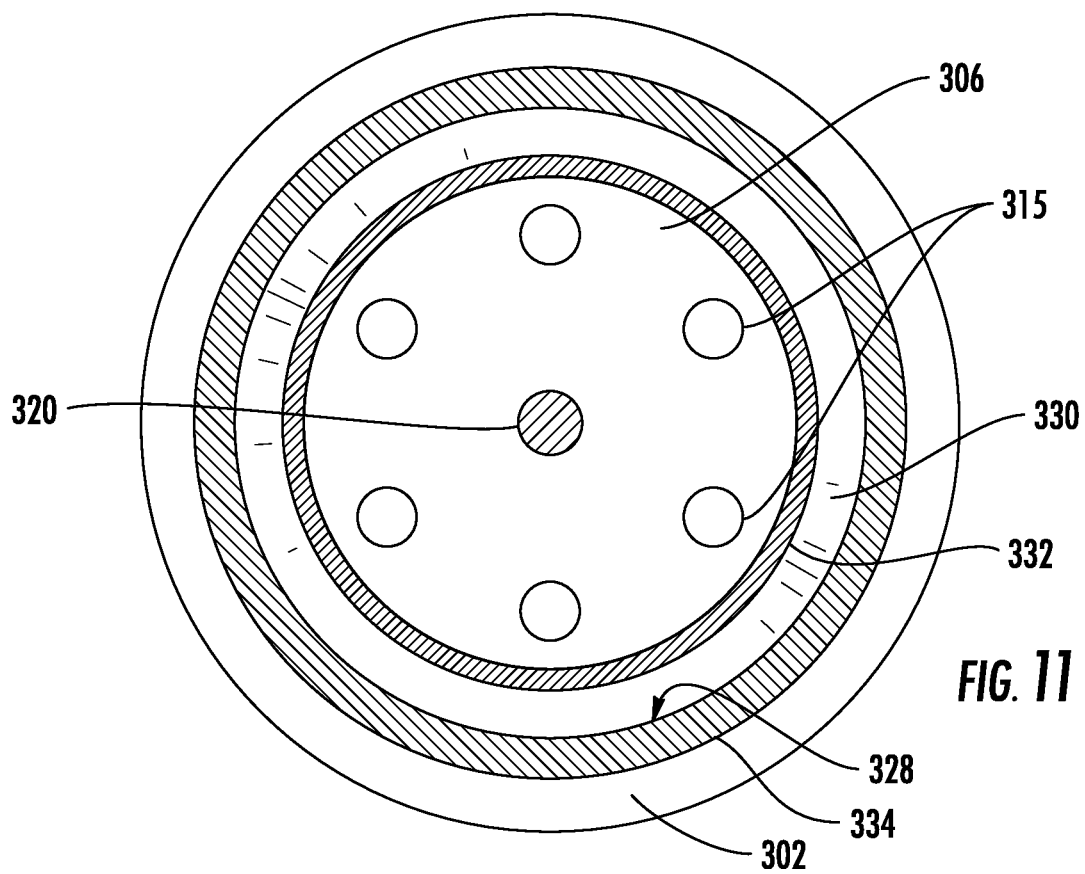
FIG. 11 illustrates a cross-section of the nuclear fuel chamber along line 11-11 shown in FIG. 3 in accordance with some embodiments discussed herein.

FIG. 11 illustrates a cross-section of the nuclear fuel chamber 306 along line 11-11 shown in FIG. 3 in accordance with some embodiments discussed herein. In particular, FIG. 11 illustrates the entrance to the nuclear fuel chamber 306 showing the interior flow paths 315 through which the operating gas enters the nuclear fuel chamber 306. Not shown from this view are the nuclear fuel elements 314 which are enclosed in the nuclear fuel chamber 306. The shaft 320 runs through the center of the nuclear fuel chamber 306. FIG. 11 also illustrates a cross section of the gas propellant chamber 332, bypass 330, interior wall of the containment vessel 328, cross section of the containment vessel 334, and containment vessel 302 along line 11-11. As shown in FIG. 11, the nuclear fuel chamber 306 includes multiple interior paths 315 for the operating gas to enter the nuclear fuel chamber 306, to travel through the nuclear fuel chamber 306, and to be heated by the nuclear fuel elements housed in the nuclear fuel chamber 306.

FIG. 4 illustrates a partial section view of a nuclear power generation apparatus in accordance with some embodiments discussed herein. In particular, FIG. 4 illustrates a nuclear power generation apparatus 400 comprising a containment vessel 402 housing a gas propellant chamber 426 which includes an inlet assembly 404, fuel-core chamber 406, and exhaust assembly 408. The containment vessel 402 also defines a circulation path 410 for the operating gas to flow in the closed system. As shown in FIG. 4, in this embodiment, the inlet assembly 404 includes a compressor 912, such as an axial compressor as illustrated in FIG. 4, disposed in the inlet port or first end of the annular body of the gas propellant chamber 426. In the embodiment illustrated in FIG. 4, the inlet port of the annular body of the gas propellant chamber 426 has a cross section that decreases along the length of the inlet port where the compressor 912 is disposed. Such restriction in the cross section may help to compress the operating gas to be directed to the nuclear fuel chamber. The nuclear fuel chamber 406 includes nuclear fuel elements 1014, and the exhaust assembly 408 includes a nozzle 1316 and a turbine assembly 1318. The nozzle 1316 forms the exhaust port or the second end of the annular body of the gas propellant chamber 426. The compressor 912 is connected to the turbine assembly 1318 by a shaft 420.

In the embodiment illustrated in FIG. 4, the exhaust assembly 408 includes a turbine assembly 1318 which includes a first turbine 1319 in line with the exit of the nozzle 1316 and connected to the shaft 420 which is connected upstream to the inlet assembly components. Also in the embodiment illustrated in FIG. 4, a second turbine 1323 is in communication with a stator belt 1321 and is connected to the shaft 420 to convert kinetic energy to rotational energy and then to electricity through the rotor/stator combination. Also in the embodiment illustrated in FIG. 4, a circulation fan 932 is connected to the shaft 420 in the inlet assembly downstream of the compressor 912 to assist in drawing the operating gas into the inlet assembly and to accelerate and direct the operating gas entering the inlet assembly. Such positioning of the turbine assembly 1318 in line with the nozzle 1316, with an additional set of turbine blades 1323, as well as incorporating the generator inside the containment vessel 402, may decrease the size of the apparatus allowing for a more compact design and may improve the efficiency of the apparatus in some embodiments. The integration of the heat source with the conversion assembly provides reduced overall system dimensions. The nuclear fuel chamber can be designed so that the pressure and temperature at the outlet of the nuclear fuel chamber satisfy the velocity required at the inlet of the conversion assembly for the configuration. This is the advantage of using a nuclear reactor (potential for very high power density) and integrating the components.

As shown in FIG. 4 by the dotted lines, the turbine assembly 1318 in the embodiment illustrated in FIG. 4 may also be connected to a generator and a flywheel.

As noted in the description of FIG. 1, the compressor 912 and turbines 1319, 1323 rotate along a single axis. However, in other embodiments, the one or more of the components may rotated along a different axis.

In the embodiment illustrated in FIG. 4, a bypass is disposed between the gas propellant chamber 426 and the inner wall 428 of the containment vessel. A circulation fan 932 is disposed upstream of the bypass to force operating gas through the bypass. The bypass may allow for cooling of the nuclear fuel chamber 406 to avoid overheating of the nuclear power generation apparatus 400. The gas flowing through the bypass in this configuration, after it has been accelerated by the circulation fan in the inlet assembly, may augment the kinetic energy to be converted to rotational energy. The bypass may be modified as needed to achieve this and other benefits.

Details of the inlet assembly 404, nuclear fuel chamber 406, and exhaust assembly 408 are provided in FIGS. 9, 10A, and 13, respectively. However, the components in the inlet assembly 404, nuclear fuel chamber 406, and exhaust assembly 408 may be modified to resemble the components shown in the detail views of FIGS. 6-8, and 10B. For instance, an axial compressor or a centrifugal compressor may be used in the embodiment illustrated in FIG. 4. In addition, nuclear fuel elements shown in FIGS. 10A and 10B may alternatively be used in the nuclear fuel chamber 406.

Figure 5:
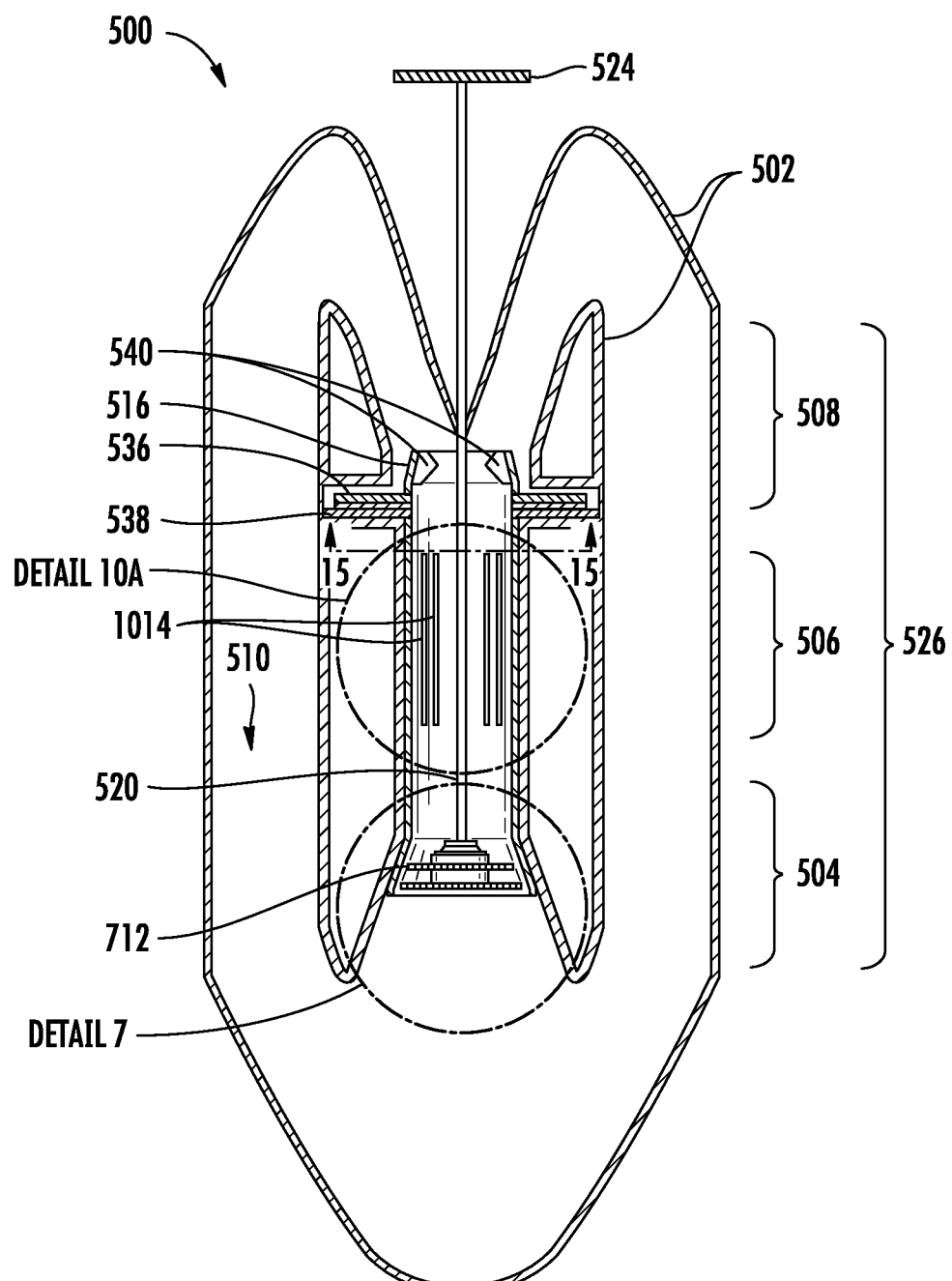
FIG. 5 illustrates a partial section view of a nuclear power generation apparatus having a stator/rotor combination integrated into the exhaust assembly in accordance with some embodiments discussed herein.

In some embodiments, a rotor/stator combination may be incorporated into the nozzle. FIG. 5 illustrates a partial section view of a nuclear power generation apparatus in accordance with some embodiments discussed herein. In particular, FIG. 5 illustrates a nuclear power generation apparatus 500 comprising a containment vessel 502 housing a gas propellant chamber 526 which includes an inlet assembly 504, nuclear fuel chamber 506, and exhaust assembly 508. The containment vessel 502 also defines a circulation path 510 for the operating gas to flow in the closed system. As shown in FIG. 5, in this embodiment, the inlet assembly 504 includes a compressor 712, such as an axial compressor as illustrated in FIG. 5, disposed in the inlet port or first end of the annular body of the gas propellant chamber 526. In the embodiment illustrated in FIG. 5, the inlet port of the annular body of the gas propellant chamber 526 has a cross section that decreases along the length of the inlet port where the compressor 712 is disposed. Such restriction in the cross section may help to compress the operating gas to be directed to the nuclear fuel chamber. The nuclear fuel chamber 506 includes nuclear fuel elements 1014.

In the embodiment illustrated in FIG. 5, the exhaust assembly 508 includes a nozzle 516 that includes angled blades 540 disposed within the nozzle to allow for the nozzle 516 to rotate as the operating gas enters and exits the nozzle 516. The nozzle 516 forms the exhaust port or the second end of the annular body of the gas propellant chamber 526. The nozzle 516 is coupled to a rotor 536 that rotates with the nozzle 516. The rotor 536 is in communication with a stator 538 by way of a high performance bearing such as a magnetic bearing. The stator 538 is connected to the nuclear fuel chamber 506 and is stationary as the rotor 536 rotates with the nozzle 516. The embodiment illustrated in FIG. 5 allows for further integration of the components in the apparatus by incorporating the electricity generator in the exhaust assembly and relies on a high gas velocity to rotate the nozzle 516.

In some embodiments, a flywheel 524 may be incorporated in the apparatus. As illustrated in FIG. 5, the compressor 712 is rotationally connected to a flywheel 524 by a shaft 520 running through the nuclear power generation apparatus 500. The compressor 712 and flywheel 524 rotate along the same axis. However, in other embodiments, the components may rotate along different axes. In the embodiment illustrated in FIG. 5, the flywheel 524 is positioned outside of the containment vessel. In other embodiments, an external flywheel may not be used. As noted previously, a flywheel may be added to any of the embodiments disclosed here. The flywheel may be internal or external to the containment vessel. In some embodiments, the nuclear fuel chamber 506 may rotate with the nozzle 516 and rotor 516, especially for space applications since the gravitational forces may be minimal. For instance, the nuclear fuel chamber 506 may be connected to the nozzle 516 and rotor 536 so that the nuclear fuel chamber 506 is rotationally coupled to the nozzle 516 and rotor 536. Any of the embodiments disclosed herein may include a rotating nuclear fuel chamber.

Figure 15:
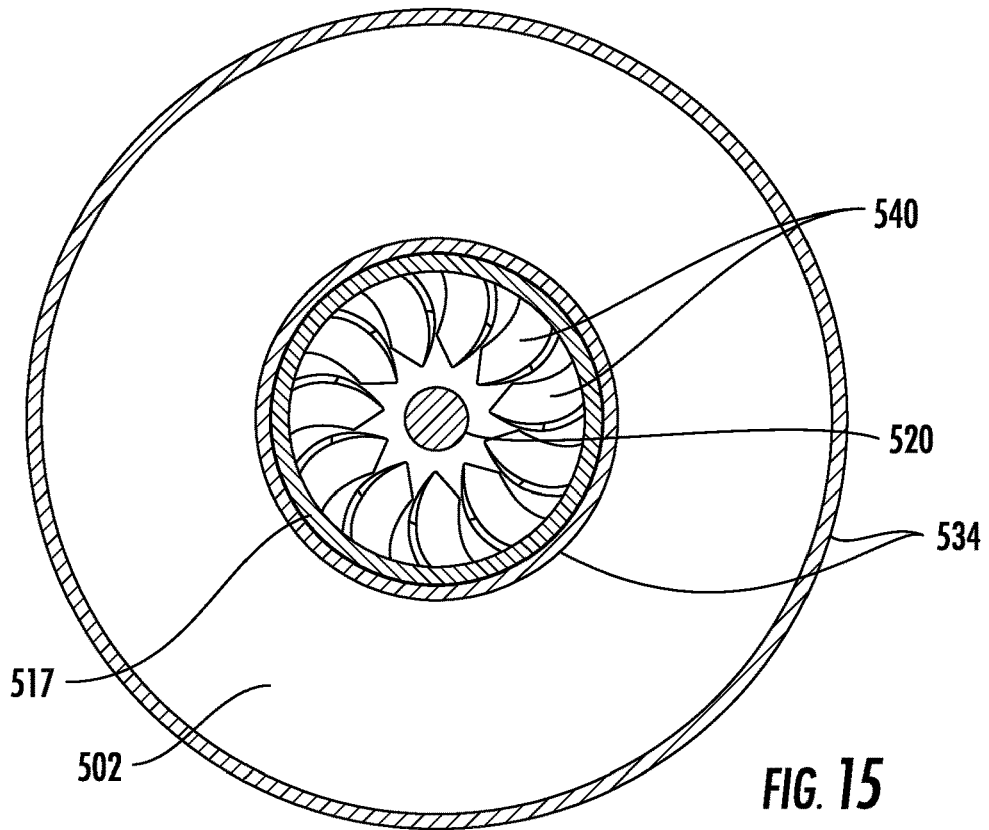
FIG. 15 illustrates a cross-section of the exhaust assembly nozzle along line 15-15 shown in FIG. 5 in accordance with some embodiments discussed herein.

FIG. 15 illustrates a cross-section of the exhaust assembly nozzle along line 15-15 shown in FIG. 5 in accordance with some embodiments discussed herein. In particular, FIG. 15 illustrates the nozzle blades 540 as operating gas would exit the nuclear fuel chamber 506 and enter the exhaust assembly 508 including the nozzle 516. The shaft 520 is shown in the center running through the gas propellant chamber 526. FIG. 15 illustrates the cross section of the nozzle 516, cross section of the containment vessel 534, and the containment vessel 502 along line 15-15.

Details of the inlet assembly 504 and nuclear fuel chamber 506 are provided in FIGS. 7 and 10A, respectively. However, the components in the inlet assembly 504 and nuclear fuel chamber 506 may be modified to resemble the components shown in the detail views of FIGS. 8-9 and 10B. For instance, an axial compressor or a centrifugal compressor may be used in the embodiment illustrated in FIG. 5. In addition, nuclear fuel elements shown in FIGS. 10A and 10B may alternatively be used in the nuclear fuel chamber 506.

Figure 16:
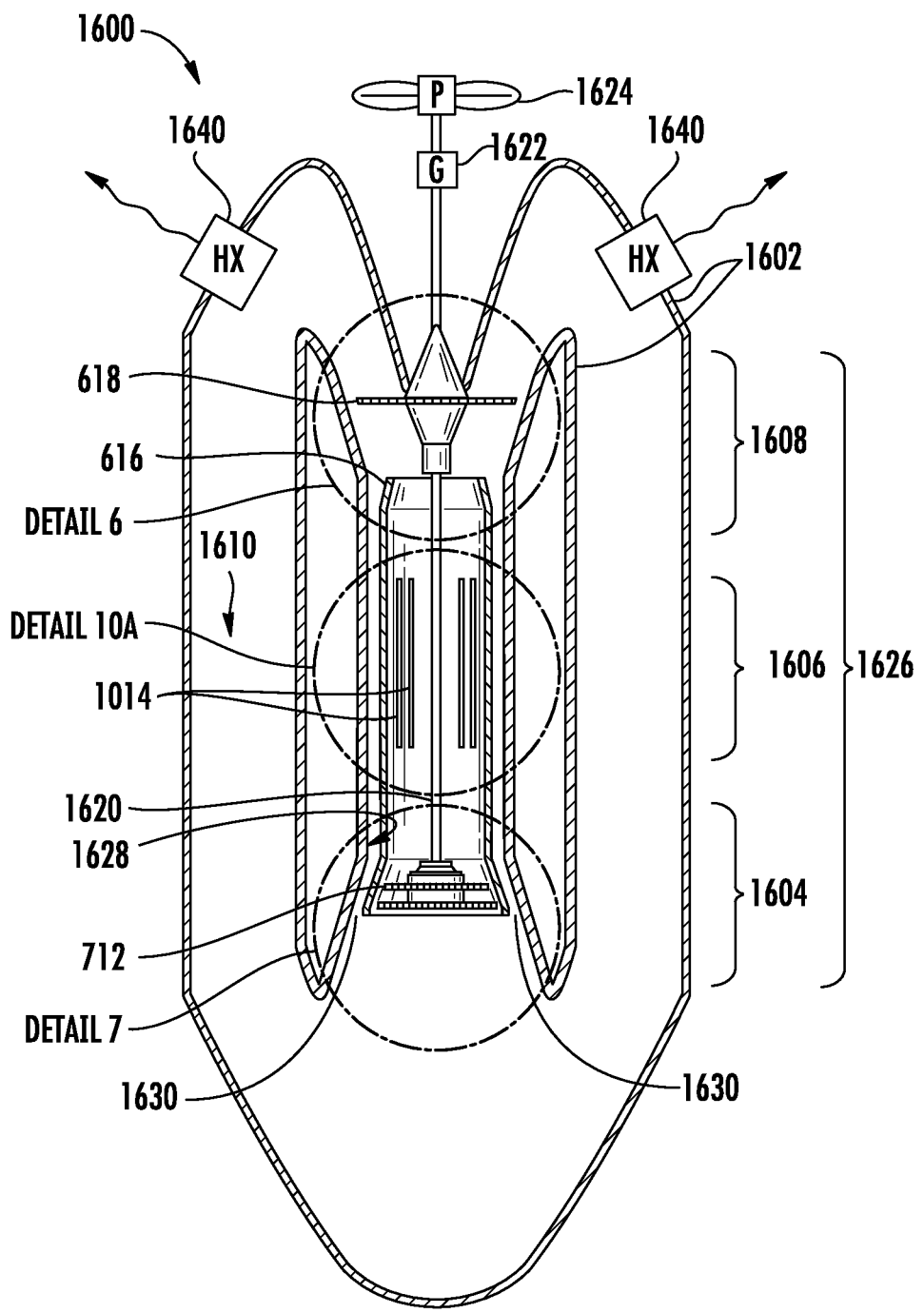
FIG. 16 illustrates a partial section view of a nuclear power generation apparatus in accordance with some embodiments discussed herein.

FIG. 16 illustrates a partial section view of a nuclear power generation apparatus in accordance with some embodiments discussed herein. In particular, FIG. 16 illustrates a nuclear power generation apparatus 1600 comprising a containment vessel 1602 housing a gas propellant chamber 1626 which includes an inlet assembly 1604, nuclear fuel chamber 1606, and exhaust assembly 1608. The containment vessel 1602 also defines a circulation path 1610 for the operating gas to flow in the closed system. As shown in FIG.

16, in this embodiment, the inlet assembly 1604 includes a compressor 712, such as an axial compressor as illustrated in FIG. 16, disposed in the inlet port or first end of the annular body of the gas propellant chamber 1626. In the embodiment illustrated in FIG. 16, the inlet port of the annular body of the gas propellant chamber 1626 has a cross section that decreases along the length of the inlet port where the compressor 712 is disposed. Such restriction in the cross section may help to compress the operating gas to be directed to the nuclear fuel chamber. The nuclear fuel chamber 1606 includes nuclear fuel elements 1014, and the exhaust assembly 1608 includes a nozzle 616 and turbine assembly 618. The nozzle 616 forms the exhaust port or the second end of the annular body of the gas propellant chamber 1626. The compressor 712 is connected to a turbine assembly 618, a generator 1622, and a propeller 1624 by a shaft 1620 running through the nuclear power generation apparatus 1600. The compressor 712, turbine assembly 618, and propeller 1624 rotates along the same axis. However, in other embodiments, the components may rotate along different axes. The embodiment illustrated in FIG. 16 also includes bypasses 1630 along inner wall 1628 of containment vessel 1602 to allow for cooling of the nuclear fuel chamber 1606 and improve the efficiency of the system.

In the embodiment illustrated in FIG. 16, the exhaust assembly 1608 includes a nozzle 616. In the embodiment illustrated in FIG. 16, the propeller 1624 is positioned outside of the containment vessel and may be used for propulsion, while the apparatus also generates electricity and district heating, for example for use on board a submarine. In other embodiments, an external propeller may not be used. In the embodiment illustrated in FIG. 16, heat exchangers 1640 are also included for process heat and to efficiently cool the operating gas prior to re-entry into the inlet assembly 1604.

The present apparatus provides the superior qualities of nuclear fuel (its remarkable energy per mass and its long-life) in a gas-propellant system to create an electricity generating system taking better advantage of the nuclear fuel qualities and providing a simpler, integrated design that eliminates some of the complex thermal conversion machinery and related significant energy losses from current nuclear reactor designs, as well as the risks and maintenance associated with such machinery. This apparatus also provides for the generation of mechanical and/or thermal energy in addition to electricity. The simpler, integrated design also allow for substantially greater design flexibility as well as the capability to optimize the expected electricity and other energy production through the adjustment of various design features, such as the type and configurations of the components in the apparatus (e.g., the compressor, turbine, nozzles, rotor/stator belts, etc.), the arrangement of nuclear fuel element lattice and other components in the fuel core, the type of the operating gas, and the configuration of the containment vessel. By applying current technologies and methodologies through computer modeling and other analyses, substantially enhanced design specifications can be achieved in a cost-effective manner and these processes can be easily adapted to provide alternative designs for different, specific operational uses intended for the present apparatus.

The present apparatus is also an inherently safer design than that of many current nuclear reactors because it may have a lower nuclear core power density, could use an inert gas as the coolant, and eliminates all or most of the thermal conversion machinery. The apparatus is capable of being factory manufactured, which would result in lower and more predictable capital costs. The apparatus could be fueled in the factory under controlled circumstances, and then safely transported to its onsite production location, making it more proliferation resistant. Additionally, the more efficient and simpler design of the invention may result in the use of a smaller quantity of nuclear fuel, and for a longer period of time, thus enhancing its safety features and providing advantages over other nuclear reactor designs as far as nuclear waste disposal and being proliferation resistant. The safety and simpler operations of the apparatus allows it to be sited at desalination plants, as well as adjacent to industrial and other facilities to provide such facilities process heat in addition to electrical power. These same qualities would also allow for broad deployment for the mechanical energy generated by the apparatus to be used in various applications. Further, the smaller, more compact design would reduce the difficult siting or location issues currently considered for nuclear reactors.

The present apparatus may utilize, with adaptions understood by those persons skilled in the art, current state-of-the-art materials and designs for jet engines and thermal nuclear propulsion. The present apparatus also generally permits advances made in jet engine designs and thermal nuclear propulsion to be incorporated either through the designs of future systems or by minor retrofitting of then existing reactors that use the apparatus.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for generating electricity comprising:
a gas propellant chamber comprised of an annular body defining first and second ends, the first end of the annular body defining an inlet assembly that is configured to draw operating gas into the gas propellant chamber and the second end defining an exhaust assembly that is configured to expel operating gas from the gas propellant chamber;
a nuclear fuel chamber positioned within the annular body of the gas propellant chamber between the first and second ends, the nuclear fuel chamber housing nuclear fuel elements and defining one or more interior chambers forming one or more elongate flow paths within the nuclear fuel chamber through which the operating gas passes and heat is transferred from the nuclear fuel elements to the operating gas;
a compressor positioned proximate to the first end of the gas propellant chamber, the compressor configured to compress the operating gas prior to entry into the nuclear fuel chamber;
a conversion apparatus positioned proximate to the second end of the gas propellant chamber, the conversion apparatus having a circumference and configured to convert kinetic energy of the operating gas exiting the nuclear fuel chamber into rotational energy; and
a drive shaft extending axially through the gas propellant chamber between the first and second ends, the drive shaft coupling the compressor to the conversion apparatus, wherein the gas propellant chamber is disposed in a containment vessel, the containment vessel having an inner wall defining a circulation path for the operating gas to travel from the conversion apparatus to the inlet assembly, the circulation path comprising an initial expansion cavity positioned proximate to and downstream of the conversion apparatus, the initial expansion cavity extending completely around the circumference of the conversion apparatus, the initial expansion cavity providing the operating gas with a circulation path volume, wherein during operation, the operating gas maintains at least the circulation path volume as the operating gas flows from the conversion apparatus to about proximate of the inlet assembly.

2. The apparatus according to claim 1, wherein the circulation path is configured to cool the operating gas as the operating gas travels from the conversion apparatus to the inlet assembly.

3. The apparatus according to claim 1, wherein the circulation path is configured to reduce the pressure of the operating gas as the operating gas travels from the conversion apparatus to the inlet assembly.

4. The apparatus according to claim 1, wherein the containment vessel extends at least 1 meter on either side of the exhaust assembly and the inlet assembly.

5. The apparatus according to claim 4, wherein the containment vessel extends at least 2 meters on either side of the exhaust assembly and the inlet assembly.

6. The apparatus according to claim 1, wherein the exhaust assembly has a first diameter and the circulation path has a second diameter, the second diameter of the circulation path is larger than the first diameter of the exhaust assembly.

7. The apparatus according to claim 6, wherein the second diameter of the circulation path is at least two times larger than the first diameter of the exhaust assembly.

8. The apparatus according to claim 7, wherein the second diameter of the circulation path is at least three times larger than the first diameter of the exhaust assembly.

9. The apparatus according to claim 1, wherein the compressor is an axial compressor.

10. The apparatus according to claim 1, wherein the compressor is a centrifugal compressor.

11. The apparatus according to claim 1, wherein the compressor is a centrifugal compressor without a diffuser.

12. The apparatus according to claim 1, wherein the containment vessel comprises radioactive shielding.

13. The apparatus according to claim 1, wherein the gas propellant chamber comprises one or more ceramic components.

14. The apparatus according to claim 1, wherein the operating gas comprises air, argon, helium, carbon dioxide, or combinations thereof.

15. The apparatus according to claim 1, wherein the operating gas comprises atmospheric gas.

16. The apparatus according to claim 1, wherein the operating gas has a first velocity when entering through the inlet assembly and the operating gas has a second velocity when exiting the exhaust assembly, wherein the second velocity of the operating gas differs from the first velocity of the operating gas.

17. The apparatus according to claim 16, wherein the second velocity of the operating gas is greater than the first velocity of the operating gas.

18. The apparatus according to claim 1, wherein the conversion apparatus comprises a turbine assembly, wherein the turbine assembly comprises turbine blades and is configured such that each of the turbine blades rotate during operation of the turbine assembly.

19. The apparatus according to claim 18, wherein the turbine assembly is configured to disperse the operating gas in the circulation path.

* * * * *